US012654474B2

(12) United States Patent
Maynard et al.

(10) Patent No.: US 12,654,474 B2
(45) Date of Patent: Jun. 16, 2026

(54) MEDIA APPLICATION SYSTEM WITH A MOVEABLE PLATEN ASSEMBLY FOR AUTONOMOUS MEDIA REPLENISHMENT

(71) Applicant: ZEBRA TECHNOLOGIES CORPORATION, Lincolnshire, IL (US)

(72) Inventors: Raymond E. Maynard, Westerly, RI (US); Anthony Ross Helberg, Attleboro, MA (US); Matthew D. Corvese, Cranston, RI (US); Michael F St. Germain, West Warwick, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 144 days.

(21) Appl. No.: 18/390,261

(22) Filed: Dec. 20, 2023

(65) Prior Publication Data

US 2025/0206043 A1 Jun. 26, 2025

(51) Int. Cl.

| | |
|---|---|
| ***B41J 11/04*** | (2006.01) |
| ***B41J 2/32*** | (2006.01) |
| ***B41J 3/36*** | (2006.01) |
| ***B41J 3/407*** | (2006.01) |
| ***B41J 11/00*** | (2006.01) |
| ***B41J 11/14*** | (2006.01) |

(52) U.S. Cl.

CPC ................. *B41J 11/14* (2013.01); *B41J 2/32* (2013.01); *B41J 3/36* (2013.01); *B41J 3/4075* (2013.01); *B41J 11/007* (2013.01); *B41J 11/04* (2013.01)

(58) Field of Classification Search

CPC ... B41J 11/02; B41J 11/04; B41J 11/14; B41J 2/315; B41J 2/32; B41J 3/36; B41J 3/407; B41J 3/4075

See application file for complete search history.

(56) References Cited

U.S. PATENT DOCUMENTS

| | | | | |
|---|---|---|---|---|
| 5,435,244 | A | 7/1995 | Petersen et al. | |
| 5,913,623 | A * | 6/1999 | Yamaguchi .............. | B41J 11/04 400/605 |
| 2002/0185231 | A1* | 12/2002 | Barbosa .................. | B65C 1/021 156/542 |
| 2007/0008398 | A1 | 1/2007 | Cloutier et al. | |
| 2007/0212148 | A1 | 9/2007 | Numata et al. | |
| 2010/0166475 | A1* | 7/2010 | Yamaguchi ............ | B41J 11/009 400/76 |

(Continued)

OTHER PUBLICATIONS

PCT/US2024/059029—International Search Report, USPTO ISA/US, Jan. 17, 2025.

(Continued)

*Primary Examiner* — Douglas X Rodriguez
*Assistant Examiner* — Kendrick X Liu

(57) ABSTRACT

A system is disclosed that includes a printhead, a motor, a drive train, and a platen assembly. The drive train is operatively coupled to the motor. The platen assembly includes a platen roller and is operatively coupled to the drive train. The platen assembly is configured to rotate about a platen assembly axis of rotation, in response to an operation of the motor, between a media processing position in which the platen roller forms a nip with the printhead and a media loading position in which the platen roller is rotated away from the printhead about the platen assembly axis of rotation.

18 Claims, 22 Drawing Sheets

(56) References Cited

U.S. PATENT DOCUMENTS

| | | | |
|---|---|---|---|
| 2014/0186087 | A1 | 7/2014 | Aizawa |
| 2014/0210936 | A1 | 7/2014 | Makley et al. |
| 2016/0136964 | A1 | 5/2016 | Howarth et al. |
| 2017/0087815 | A1 | 3/2017 | Medeiros et al. |
| 2019/0176494 | A1 | 6/2019 | Oguchi et al. |
| 2019/0210824 | A1 | 7/2019 | Jackson et al. |
| 2022/0073220 | A1 | 3/2022 | White et al. |

OTHER PUBLICATIONS

PCT/US2024/059029—Written Opinion of the International Searching Authority (ISA), USPTO ISA/US, Jan. 17, 2025.

* cited by examiner

MEDIA APPLICATION SYSTEM WITH A MOVEABLE PLATEN ASSEMBLY FOR AUTONOMOUS MEDIA REPLENISHMENT

BACKGROUND

A supply chain process of a logistics system, such as a warehousing system, transportation system, sorting systems, and the like, typically involves using media (e.g., printed labels and/or radio frequency identification (RFID) tags) to mark, track, locate, and/or route objects that are being sorted, stored in a location, and/or transported between locations. The objects may have various sizes, shapes, and/or be configured in various positions on a conveyor that is used to process and/or distribute the objects for labelling with the media.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
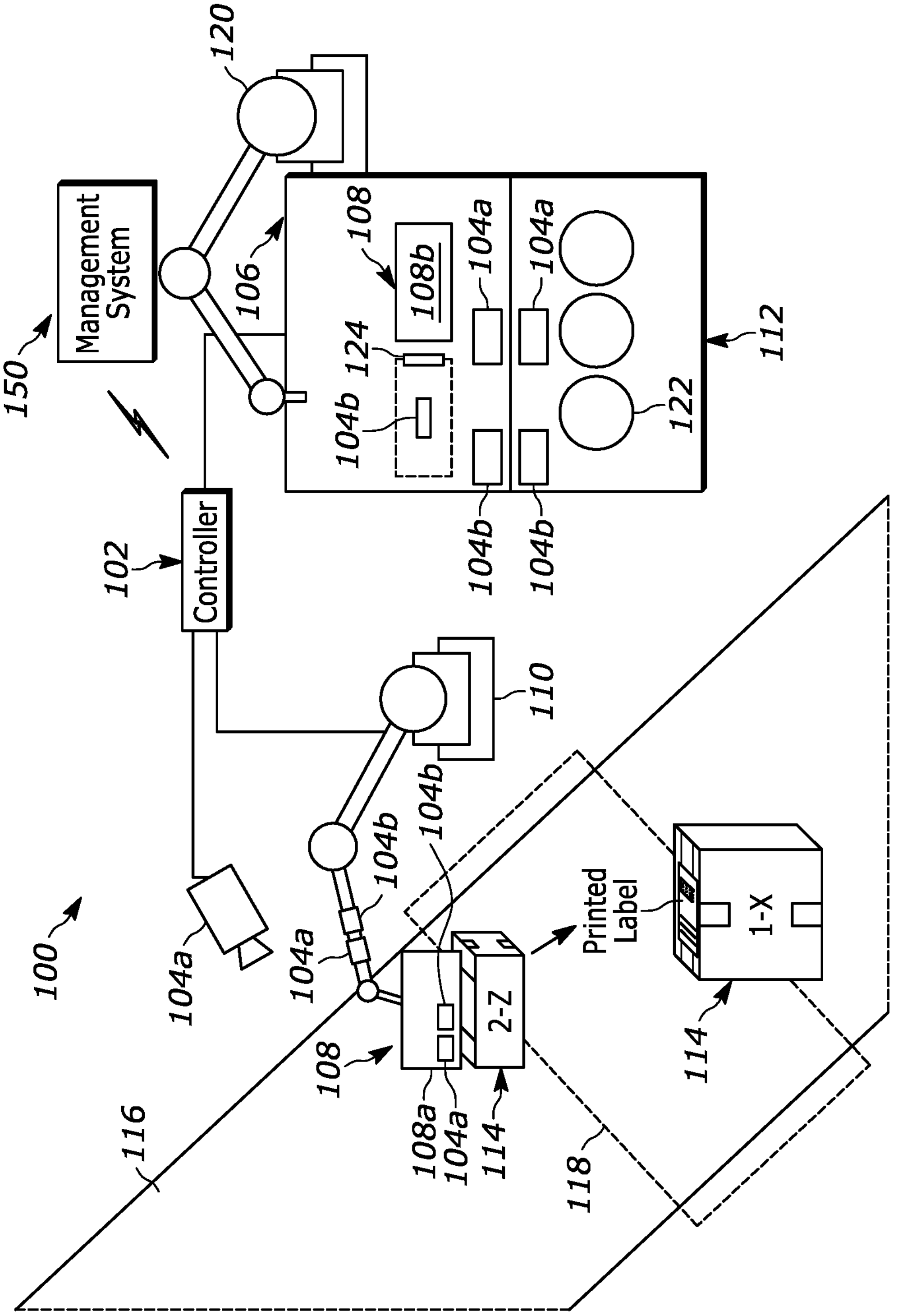
FIG. 1 illustrates an example autonomous media application system and an example management system in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

A continuum of media processing devices exist that range from high end with high-speed applicators typically designed to address same sized objects (e.g., packages, parcels, freight, etc.) to the low end printers and/or radiofrequency identifier (RFID) tag encoders manually operated by humans to address a multitude of object sizes. Media, such as labels and/or tags applied manually to objects may be applied inconsistently from object to object and at improper or unwanted locations. Manual application of media to objects is high in labor costs, subject to human error, and time consuming. As used herein, the application or affixing of media to an object is referred to as "labeling" the objects.

Automating the labeling of objects requires the orchestration of several innovations. In automated labelling systems, media can be applied to an object (e.g., an object that is to be stored, tracked, and/or transported) via a robotic device. For example, a system (e.g., an automated system of a warehouse, distribution, transportation center, sorting facility, and the like) may include a media application system that utilizes a robotic device, such as a robotic arm, that is equipped with an end effector in the form of a media applicator that can print and/or apply the media to objects (e.g., via actuation of a tamp of the media applicator). In some instances, a conveyor or other type of object moving system may move objects into a position, such as a media labeling zone, that is within range of the robotic device and/or the media applicator, and the robotic device can be controlled to position the media applicator within the media application zone near the conveyor that is transporting objects. The media labeling zone may be a space (or volume) through which the objects pass on the conveyor. When the object is in or approaching the media labeling zone, the automated labeling system can cause the robotic device to move the media applicator into position and cause the media applicator to apply the media to the object as the object passes through the media labeling zone on the conveyor. Prior to dispensing the media, the media applicator may be configured to print indicia on the media and/or to encode an RFID tag of the media. The indicia printed on the media and/or the information encoded in the RFID tag of the media may be specific to the particular object to which the media is applied or affixed and/or can include other information that is not specific to the particular object to which the media is applied or affixed.

Such automated labeling systems can advantageously improve throughput and/or minimize human intervention in the labeling process. However, in some systems human intervention can be required when the media supply of the media applicator is exhausted, and a new media supply needs to be loaded/installed in the media applicator. In order to maintain the quality of applied media, the media consumed by the media applicator can be managed by a tension control system to ensure, e.g., the registration of media is kept within a suitable tolerance. Thus, when the media must be replenished, a human operator typically would mount the core of the media supply on one or more spindles and feed the new supply of media through the media applicator along a media path to ensure the there is tension on the media, which can be tedious, dangerous, and time consuming. To further reduce cost, increase worker safety, and maintain minimum downtime, embodiments of the present disclosure provide systems and processes for autonomous replenishment of the media on the media applicator. To achieve autonomous replenishment of the media, embodiments of the present disclosure can autonomously discard any remnants of the exhausted media from the media applicator and can autonomously mount and feed a new supply of media in the media applicator to ensure the media is positioned and tensioned properly within the media applicator so that the print quality is not compromised.

In accordance with embodiments of the present disclosure, a system is disclosed. The system includes a printhead, a motor, a drive train, and a platen assembly. The drive train is operatively coupled to the motor. The platen assembly includes a platen roller. The platen assembly is operatively coupled to the drive train and is configured to rotate about a platen assembly axis of rotation, in response to an operation of the motor, between a media processing position in which the platen roller forms a nip with the printhead and a media loading position in which the platen roller is rotated away from the printhead about the platen assembly axis of rotation.

In accordance with embodiments of the present disclosure, a method disclosed. The method includes disposing a printhead in a housing; disposing a motor in the housing; disposing a drive train in the housing; and disposing a platen assembly including a platen roller in the housing. The drive train is operatively coupled to the motor and the platen assembly is operatively coupled to the drive train. The platen assembly is configured to rotate about a platen assembly axis of rotation, in response to an operation of the motor, between a media processing position in which the platen roller forms a nip with the printhead and a media loading position in which the platen roller is rotated away from the printhead about the platen assembly axis of rotation.

In accordance with embodiments of the present disclosure, which may be used in combination with any other aspect or combination of embodiments listed herein, the drive train includes a first gear operatively coupled to the motor and a second gear operatively coupled to the first gear. The motor is configured to rotate the platen assembly by driving the first and second gears.

In accordance with embodiments of the present disclosure, which may be used in combination with any other aspect or combination of embodiments listed herein, the second gear includes a flange and a shaft disposed at a proximal end of the flange. The platen assembly is operatively coupled to the second gear via the shaft and the flange operatively supports the platen assembly when the platen assembly is in the media processing position.

In accordance with embodiments of the present disclosure, which may be used in combination with any other aspect or combination of embodiments listed herein, the shaft and flange extend from the gear parallel to each other and parallel to the platen assembly rotation of axis.

In accordance with embodiments of the present disclosure, which may be used in combination with any other aspect or combination of embodiments listed herein, the platen assembly freely rotates relative to the second gear and the flange limits a rotation of the platen assembly in the media processing position.

In accordance with embodiments of the present disclosure, which may be used in combination with any other aspect or combination of embodiments listed herein, when the second gear rotates to move the platen assembly from the media loading position to the media processing position, the flange urges the platen assembly towards the media processing position.

In accordance with embodiments of the present disclosure, which may be used in combination with any other aspect or combination of embodiments listed herein, a biasing member is disposed between the flange and the platen assembly. The biasing member exerts a biasing force on the platen assembly when the platen assembly is in the media processing position.

In accordance with embodiments of the present disclosure, which may be used in combination with any other aspect or combination of embodiments listed herein, when the platen roller is in the media loading position, the biasing member pushes the platen roller to rotate away from the flange.

In accordance with embodiments of the present disclosure, which may be used in combination with any other aspect or combination of embodiments listed herein, when the second gear rotates to move the platen assembly from the media processing position to the media loading position, the platen assembly moves with the flange.

In accordance with embodiments of the present disclosure, which may be used in combination with any other aspect or combination of embodiments listed herein, the second gear is sector gear that includes first and second stop structures that limit the rotation of the second gear.

In accordance with embodiments of the present disclosure, which may be used in combination with any other aspect or combination of embodiments listed herein, a third gear operatively coupled to the second gear, the third gear configured to engage the latch to move the latch between the latched position and the unlatched position.

In accordance with embodiments of the present disclosure, which may be used in combination with any other aspect or combination of embodiments listed herein, the third gear is a sector gear and a toothless edge of the third gear forms a cam. A guide member operatively coupled to a latch arm of the latch. The guide member is configured to engage and ride along the toothless edge of the third gear and the cam is configured to displace the guide member to move the latch arm of the latch between the latched position and the unlatched position.

In accordance with embodiments of the present disclosure, which may be used in combination with any other aspect or combination of embodiments listed herein, a latch configured to retain the platen assembly in the media processing position.

In accordance with embodiments of the present disclosure, which may be used in combination with any other aspect or combination of embodiments listed herein, a printhead assembly configured to include the printhead and the latch. The latch includes a latch arm extending from the printhead assembly. The latch arm is biased towards a latched position and is configured to engage the platen assembly when the platen assembly is in the media processing position.

In accordance with embodiments of the present disclosure, which may be used in combination with any other aspect or combination of embodiments listed herein, when the platen assembly begins to transition from the media processing position to the media loading position, the latch arm is urge to an unlatched position to disengage the platen assembly.

In accordance with embodiments of the present disclosure, which may be used in combination with any other aspect or combination of embodiments listed herein, a further drive train includes a first gear and a second gear. The first gear is operatively coupled to a further motor. The second gear selectively engages with the first gear and is coupled to the platen roller. The second gear engages the first gear when the platen assembly is in the media processing position and disengages the first gear when the platen assembly in the media loading position.

In accordance with embodiments of the present disclosure, which may be used in combination with any other aspect or combination of embodiments listed herein, the printhead, the motor, the drive train, and the platen assembly are included in a housing of a media applicator. A robotic device is configured to operatively couple to the media applicator. The robotic device is configured to move the media applicator.

In accordance with embodiments of the present disclosure, which may be used in combination with any other aspect or combination of embodiments listed herein, a media replenishment system configured to present a supply of media for autonomous installation of the supply of media in the media applicator. The robotic device being configured to move the media applicator relative to the media replenishment system to facilitate transfer of the supply of media from the media replenishment system to the media applicator.

In accordance with embodiments of the present disclosure, which may be used in combination with any other aspect or combination of embodiments listed herein, the media replenishment system is configured with a media presentation position in which the media replenishment system supports the supply of media and a media transfer position in which the media replenishment system transfers the media from the media replenishment system to the media applicator.

In accordance with embodiments of the present disclosure, which may be used in combination with any other aspect or combination of embodiments listed herein, engagement of the media replenishment system by the media applicator based on movement by the robotic device causes the media replenishment system to transition from the media presentation position to the media transfer position.

In accordance with embodiments of the present disclosure, which may be used in combination with any other aspect or combination of embodiments listed herein, the media replenishment system includes a first panel, as second panel, and shafts. The first and second panels are moveable relative to each other to move between a media presentation position and a media transfer position. The shafts extend from the first panel through and beyond the second panel. The shafts are configured to support the supply of media with the second panel disposed between the supply of media and the first panel.

In accordance with embodiments of the present disclosure, which may be used in combination with any other aspect or combination of embodiments listed herein, a biasing member disposed between the first panel and the second panel to bias the first and second panel to the media presentation position.

FIG. 1 illustrates an example autonomous media application system 100 and an example management system 150 in accordance with embodiments of the present disclosure. The media application system 100 includes a controller 102, one or more cameras 104*a* and/or one or more sensor 104*b* (e.g., proximity sensors, optical sensors, inertial sensors, etc.), a docking station 106, one or more end effectors in the form of media applicators 108*a-b* (collectively 108), one or more robotic devices 110 and 120, e.g., in the form of robotic arms, and a media replenishment system 112. Embodiments of the media application system 100 may include multiple media applicators 108 and/or multiple robotic devices 110 and 120 to reduce or prevent downtime and/or a likelihood of a shutdown of the media application system 100.

As shown in FIG. 1, objects 114 may be conveyed by a conveyor 116 into a media labeling zone 118, within which the media application system 100 may autonomously apply media to the objects 114 via one of the media applicators 108. In some implementations, the conveyor 116 may be associated with and/or form part of the media application system 100. In such a case, the media application system 100 may control a speed and/or direction of the conveyor 116, e.g., via the controller 102, in order to control a speed and/or direction of objects 114 on the conveyor 116.

The docking station 106 can store the media applicators 108 and can present one or more of the media applicators 108 to the robotic device 110, such as a robotic arm, which can be controller to connect to one of the media applicators 108. For example, the robotic device 110 can be attached to the media applicator 108*a* while the media applicator 108*b* remains in the docking station 106. In some implementations there may be single media applicator 108*a* and the system 100 may be devoid of the docking station 106 or may include the docking station 106 for storing the media applicator 108*a* when the media applicator 108*a* is not being used by the media application system 100. For embodiments that include the docking station 106, the docking station 106 can, in some embodiments, include or be associated with the robotic device 120, such as a robotic arm, separate from the robotic device 110, that can be controlled to store the media applicators 108, present the media applicators 108 to the robotic arm 110 for attachment to the robotic arm 110, and/or to replenish supplies of media in the media applicators 108 via the media replenishment system 112. In some implementations, the docking station 106 and the media replenishment system 112 can be integrated with each other. In some implementations, the docking station 106 may be a static (non-robotic) mechanical structure with electrical interfaces for supporting and communicating with the media applicators 108.

The robotic device 110 can be attached to the media applicators 108 using any suitable technique. As an example, the robotic device 110 can be attached to the media applicator 108*a* via one or more couplers, e.g., mechanical, electrical, and/or electromechanical couplers. The one or more couplers of the robotic device 110 may include one or more electrical terminals that facilitate communication between the robotic device 110 and the media applicator to which the robotic device 110 is attached (e.g., the media applicator 108*a* in the present example). Additionally, or alternatively, the one or more couplers may be configured for transfer of electrical power from the robotic device 110 to one or more components of the attached media applicator 108*a* to power the one or more components.

The robotic device 110 can be autonomously controlled by the controller 102 to move the attached media applicator 108*a* relative to the objects 114 and the media applicator 108*a* can be controlled to print, encode, and/or apply media to the objects 114. In one example, robotic device 110 can vertically and laterally in space to facilitate moving the media applicator 108*a* to different positions in space. For example, the objects 114 can be conveyed by the conveyor 116 through a media labeling zone 118, and the controller 102 can control the robotic device 110 to move the media applicator 108*a* into position to align the media applicator 108*a* with a specified area of the object (e.g., a media receiving area), and can control the media applicator 108*a* to print, encode, and/or apply media to the objects 114 as the objects 114 move along the conveyor 116, e.g., through the media labeling zone 118. The controller 102 can also autonomously control the robotic device 110 to move the applicator 108*a* into position relative to docking station 106 to release the media applicator 108*a* for storage by the docking station 106 and/or to move the media applicator

108*a* into position relative to the media replenishment system 112 to facilitate media replenishment.

Outputs of the one or more cameras 104*a* and/or the one or more sensors 104*b* can be used by the controller 102 of the media application system 100 to autonomously control an operation of the docking station 106, the media applicators 108, the robotic device 110, and/or the replenishment system 112. The one or more sensors 104*b* can be mounted on the docking station 106, the media applicators 108, the robotic device 110, the media replenishment system 112, and/or at other locations. The controller 102 may receive outputs from the one or more sensors 104*b* to determine a position of robotic device 110, a position of the media applicator 108*a* relative to the docking station 106, and/or the media replenishment system 112 and/or to determine a status of the docking station 106, the media applicator 108*a*, the robotic device 110, the media replenishment system 112, the objects 114, and/or the conveyer 116. As another example, the controller 102 of the media application system 100 may receive images (or video that includes multiple image frames) of the objects 114 being conveyed on the conveyor 116 from the one or more cameras 104*a* and/or may receive images of a position of the media applicator 108*a* and/or the robotic device 110. In some implementations, the one or more cameras 104*a* can be mounted at various locations throughout the physical environment within which the media application system 100 is implemented. For example, one of the cameras 104*a* may be mounted to a support structure (e.g., a gantry) of the conveyor 116, the docking station 106, the applicators 108, the robotic device 110, and/or the media replenishment system 112. As one example, one of the cameras 104*a* may be mounted to the media applicator 108*a* in order to permit the controller 102 of the media application system 100 to monitor a portion of the conveyor 116, track positions of the objects 114 on the conveyor 116, track a position of the media applicator 108*a*, e.g., to align the media applicator 108*a* with objects 114 to facilitate labeling the objects 114 and/or to align the media applicator 108*a* with the media replenishment system 112 to facilitate autonomous reloading of the media applicator(s) 108 with media supplies 122 managed by the media replenishment system 112. The one or more cameras 104*a* may be configured to stream images depicting a portion of the conveyor 116 that receives the objects 114 before the objects 114 reach the media labeling zone 118 on the conveyor 116. In this way, via the streamed images, the media application system 100 may monitor the conveyor 116 to detect the incoming objects 114 that are to receive media from one of the media applicators 108.

The controller 102 of the media application system 100 may process the images of the objects 114 captured by the camera(s) 104*a* using an image processing model that is configured to identify one or more characteristics of the object (e.g., positions of the objects 114 on the conveyor 116, sizes of the objects 114, shapes of the objects 114, types of the objects 114, identifiers of the objects 114, and/or media receiving areas on the objects 114, among other characteristics). The position of the objects 114 (which may be referred to herein as "object positions") may include or be defined by an orientation of the object (e.g., relative to a center axis or other reference point of the conveyor, relative to a location of the camera, and/or relative to a location of the robotic arm), and/or a location of the objects 114 on the surface of the conveyor 116 (e.g., relative to a reference point of the conveyor, relative to a location of the camera, and/or relative to a location of the robotic arm). The image processing model may utilize any suitable computer vision technique to identify the object within the image and/or determine one or more characteristics of the object as described herein. For example, a computer vision technique of the image processing model may include one or more of an image recognition technique (e.g., an Inception framework, a ResNet framework, and/or a Visual Geometry Group (VGG) framework), an object detection technique (e.g., a Single Shot Detector (SSD) framework, and/or a You Only Look Once (YOLO) framework), an object in motion technique (e.g., an optical flow framework), an optical character recognition technique, among other examples.

In some implementations, the image processing model can be executed by the controller 102 to analyze the one or more images to detect specific and/or unique characteristics associated with a particular object. For example, because individual objects may be configured to receive different labels (rather than a same label being applied to every object), the objects may include an object identifier, such as a text identifier, a barcode, or other unique marking that is known and/or associated with the label application system and/or label management system. As an example, a first one of the objects 114 may be identified by an object identifier "1-X," and a second one of the objects 114 may be identified by an object identifier "2-Z." In some implementations, the individual characters may be associated with certain mappings and/or codes that can be interpreted by the controller 102 to identify content that is to be printed on media to be applied or affixed to the objects 114, to identify a type of media that is to be applied to the objects 114, to identify a type of media applicator that is to be selected for the objects 114, and so on. Accordingly, the media application system 100 using the image processing model can identify and/or detect object identifiers on objects depicted in the images.

The media application system 100 may receive instructions from the management system 150. The instructions may indicate content that is to be printed on and/or encoded the media by one or more of the media applicators 108 (e.g., the media applicator 108*a* in the present example). In some implementations, the instructions may be different for each of the objects 114 or may be the same for multiple objects 114. As an example, the instructions may be the same for all objects 114 or a set of objects 114. As another example, the media application system 100 may receive individual instructions for individual objects 114 (or types of objects) that are being conveyed by the conveyor 116. For example, the instructions may indicate that one of the objects 114 that has a particular characteristic (e.g., a particular identifier or is a particular type) is to receive media with corresponding content. Accordingly, based on identifying and/or detecting an object identifier of the particular one of the objects 114, the media application system 100 may determine content that is associated with the object identifier to permit the media application system to print the content to media and/or encode the content in an RFID tag of the media and subsequently apply the media to the particular one of the objects.

In one example, embodiments of the media applicators 108 can be media processing device configured to process (e.g., print, encode, etc.) media by drawing the media from the media source and routing the media proximate to various media processing components (e.g., printhead(s), RFID/NFC reader/encoder, magnetic stripe reader/encoder, etc.). Processing the media from the media source may facilitate a continuous or batch printing and/or encoding process. As an example, embodiments of media applicator 108*a* may be configured to print and/or encode media drawn from a media source, such as a roll of media, installed in the media applicator 108*a*. The media may include a continuous web such as a spool of lined or linerless media. As a non-limiting example, the continuous web of media can be coated on one surface with a pressure sensitive adhesive and can include a printable surface on the opposite surface. For lined media, the media can include a release liner overlaying the adhesive that can be removed to expose the adhesive when the media is output from the media processing devices and/or when the media will be affixed to an object. For linerless media, the media is devoid of the release liner. For thermal transfer printing, the printable surface of the linerless media is configured to receive a pigment (e.g., ink, resin, wax-resin, etc.) that is transferred from a ribbon supply. For direct thermal printing, a thermal printhead of the media applicator directly contacts the printable surface triggering a chemical and/or physical change in a thermally sensitive dye covering and/or embedded in at least a portion of the printable surface of the media. In addition, or in the alternative, the media can include a radiofrequency identification device (RFID) or near-field communications (NFC) inlay that can be written to and/or read by a RFID/NFC encoder.

The web of media is routed along a media path in the media applicator 108*a* from the media supply to a print and/or encoding position located adjacent to the printhead (e.g., a thermal printhead) and/or the RFID/NFC encoder. The position of components of the media applicator 108*a* relative to other components can be defined based on the flow of media along the media path from the media source to the outlet and/or a take-up spindle. For example, the media source installed in the media applicator 108*a* is upstream of the printhead, the printhead is downstream of the media source (the web of media), and the outlet of the media applicator 108*a* is downstream of the media source and the printhead along the media path. The continuous web of media can be pulled through the media path by a driven platen roller. The printhead is generally configured to form a nip with the platen roller to pinch the media between the printhead and the platen roller. In addition to pulling the media, or in the alternative, this pinching or compressive force aids in achieving adequate print quality. Once printed and/or encoded, the printed and/or encoded portion of the media can be advanced outwardly from the printer through a media outlet by the platen roller where it can be cut and/or torn to separate the printed and/or encoded media from the media supply. For media that includes a liner, the media processing device can also include a peeler downstream of the nip formed by the printhead and the platen roller. The peeler can separate the liner from the media such that the media is output from the media processing device with the adhesive of the media exposed, while the liner can be wound on the take-up spindle.

During use of the media applicator 108*a* by the media applicator system 100, the media applicator 108*a* and/or the controller 102 can be configured to determine that the supply of media in the media applicator 108*a* is depleted or will be depleted soon (e.g., an amount of media remaining in media applicator 108*a* is less than a specified amount of media). The media applicator 108*a* and/or the controller 102 can determine that the supply of media is depleted or will soon be depleted using any suitable techniques. As one example, the media applicator 108*a* can include one or more sensors 104*b* configured to detect when the supply of media is depleted or will soon be depleted and can output a signal to the controller 102. As another example, a quantity of the media remaining can be calculated or estimated based on, for example, on an initial quantity of media loaded into the media applicator 108*a*, and a quantity of media that has been dispensed by the media applicator 108*a*, which may be based determined on one or more of a number of print jobs executed by the media applicator 108*a*, a number of revolution of a payout spindle of the media applicator 108*a* (e.g., steps of a stepper motor, measured by a rotary encoder, etc.), a print speed, a starting diameter of a media roll, a thickness of the media, a length of media units dispensed by the media applicator 108*a*, and/or other information.

When the media applicator 108*a* and/or controller 102 determines that the supply of media is depleted or will be depleted soon (or in some scenarios when different media is required) the controller 102 can control the robotic device 110 to move the media applicator, e.g., media applicator 108*a*, to the docking station 106 (e.g., for embodiments in which the docking station 106 is configured to facilitate installation of media in the media applicator 108*a*) or to the media replenishment system 112 to facilitate installation of the media in the media applicator 108*a*. For embodiments in which the docking station 106 is configured to facilitate installation of a new supply of media in the media applicators 108 (e.g., via robotic device 120), when the robotic device 110 returns the media applicator 108*a* to the docking station 106, the robotic device 110 can attach to the media applicator 108*b*, which may already have a new supply of media installed therein such that the robotic device 110 does not need to wait for the installation of a new media supply in the media applicator 108*a* and can resume operation with the media applicator 108*b*, which may result in reduced downtime of the media application system 100. The controller 102 can control the robotic device 110 or the robotic device 120 associated with the docking station 106 and/or the media applicator 108*a* to autonomously discard the remaining media, media core(s), and/or media frames/cartridges from the media applicator 108*a* and to autonomously install a new supply of media into media applicator 108*a* via an interaction with the media replenishment system 112. In some implementations, the controller 102 may also control the media replenishment system 112 to prepare the supply of media for installation in the media applicator 108*a*. As one example, the media replenishment system 112 can be configured to pre-tension the supply of media to aid in installation of the supply of media in the media applicators 108.

In one example, the supply of media to be installed in the media applicator 108*a* can include a media roll wound about a first core. In some instances, for example for media with a liner, the supply of media can include a second core that is attached to a terminal end of a liner of the media. During operation as the media is output by the media applicator 108*a*, the liner can be separated from the media (e.g., by the peeler) and wound about the second core. When a new supply of media is installed into the media applicator 108*a*, the first core of the supply of media is mounted on a payout spindle of the media applicator 108*a* and the media is routed through the media applicator 108*a* along a media path before the media applicator 108*a* can utilize the supply of media. The media replenishment system 112 can present the supply of media to the media applicator 108*a* such that the first core of the supply of media can be autonomously received by the payout spindle and so that the media can be autonomously routed through the media applicator 108*a* along the media path. For embodiments of the supply of media that include the second core, the media replenishment system 112 can be configured to present the supply of media to the media applicator 108*a* such that the second core of the supply of media can be autonomously received by the take-up spindle of the media applicator 108*a*.

As indicated above, FIG. 1 is provided as an example of a media application system. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
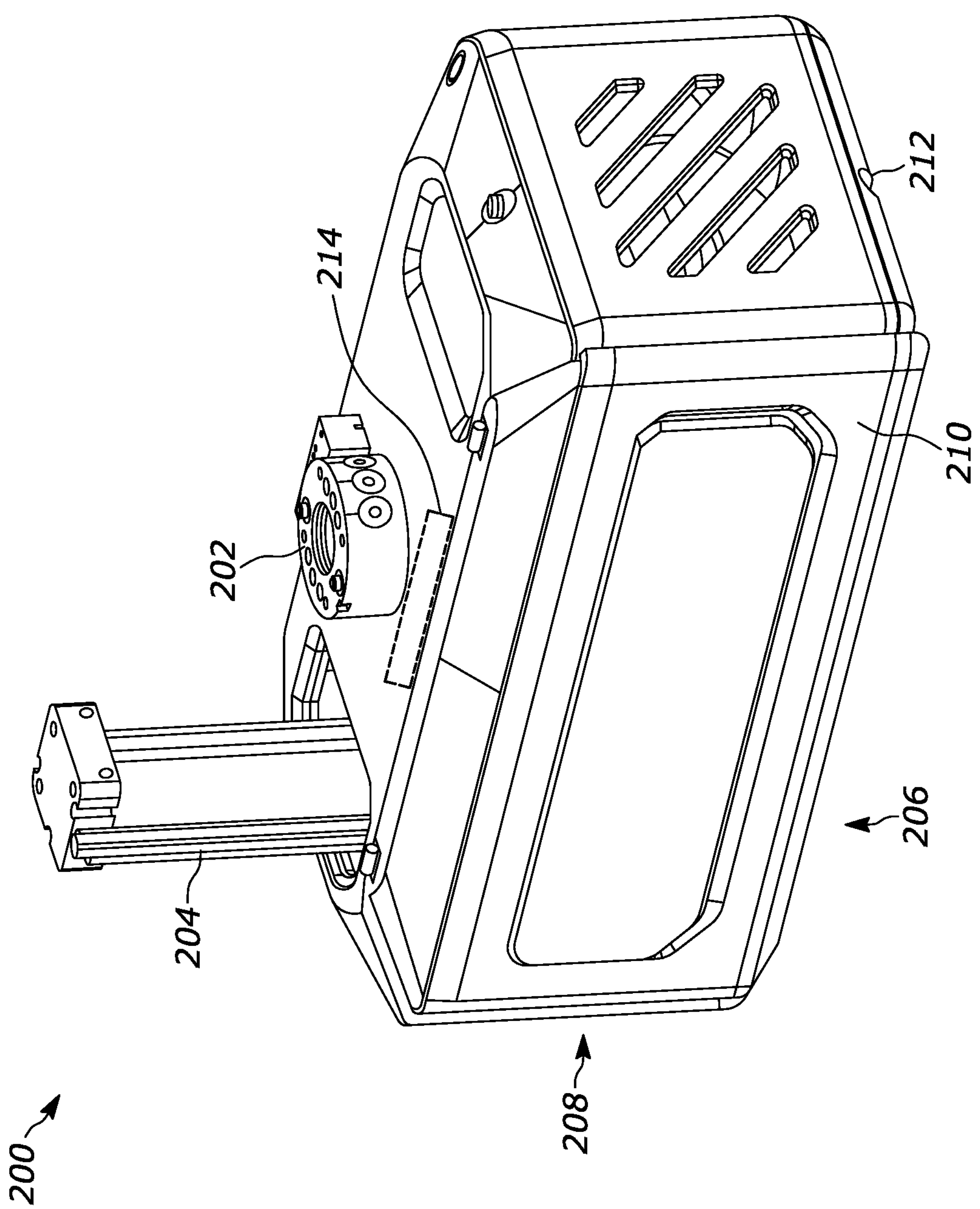
FIG. 2 illustrates an example embodiment of a media applicator in accordance with embodiments of the present disclosure.

FIG. 2 illustrates an example embodiment of a media applicator 200 which can be embodied as one or more of the media applicators 108 shown in FIG. 1, for example, the media applicator 108*a*. As shown in FIG. 2, the media applicator 200 includes a housing 206, an electromechanical coupling 202 and a tamp 204. The tamp 204 may be positioned toward an output side 208 of the media applicator 200 from which a media is output from the media applicator 200. The tamp 204 may be hydraulically actuated (e.g., using an air-powered vacuum generator), pneumatically actuated, and/or electromechanically actuated (e.g., using a motor). In one example, the media applicator 200 includes a media door or other moveable barrier 210 that facilitates access to an interior volume of the media applicator 200 and to components within the media applicator 200 for handling the media during an operation of the media applicator 200 (e.g., a payout roller, a take-up roller, a printhead, an RFID/NFC encoder, a platen roller, a peeler, a cutter, dancer arms, and/or other components of the media applicator 200). In some implementations, the media door 210 may be opened via an actuator 214 of the media applicator 200.

The media applicator 200 includes a dock terminal 212 that is configured to couple with a dock interface 124 of the docking station 106 illustrated in FIG. 1. The dock terminal 212 may enable the controller 102 to communicate with the media applicator 200 and/or supply power to the media applicator 200 via the dock interface and/or the docking station 106. In some implementations, the controller 102 may cause the actuator 214to automatically open the media door 210 upon the media applicator 200 being returned to a dock of the docking station 106 and/or upon the media applicator 200 receiving power from the dock interface 124 of the docking station 106 via the dock terminal 212 (e.g., to facilitate replenishment of media in the media applicator 200 via the replenishment system 112). In some implementations, the media applicator 200 may include a battery. For example, the battery may store an electric charge that is used to power one or more components of the media applicator 200. The electric charge may be received via the dock terminal 212 when the media applicator 200 is placed in a dock of the docking station 106 and/or may be received via the electromechanical coupling 202 when the media applicator 200 is attached to the robotic arm 110. Alternatively, the media applicator 200 can be devoid of a battery and can receive power from robotic arm 110 via the electromechanical coupling 202 and/or from the docking station 106 via the dock terminal 212.

As indicated above, FIG. 2 is provided as an example of a media applicator. Other examples may differ from what is described with regard to FIG. 2. The number and arrangement of devices/components shown in FIG. 2 are provided as an example. In practice, there may be additional devices/components, fewer devices/components, different devices/components, or differently arranged devices/components than those shown in FIG. 2. Furthermore, two or more devices/components shown in FIG. 2 may be implemented within a single device/component, or a single device/component shown in FIG. 2 may be implemented as multiple, distributed devices/components. Additionally, or alternatively, a set of devices/components (e.g., one or more devices/components) shown in FIG. 2 may perform one or more functions described as being performed by another set of devices/components shown in FIG. 2.

Figure 3:
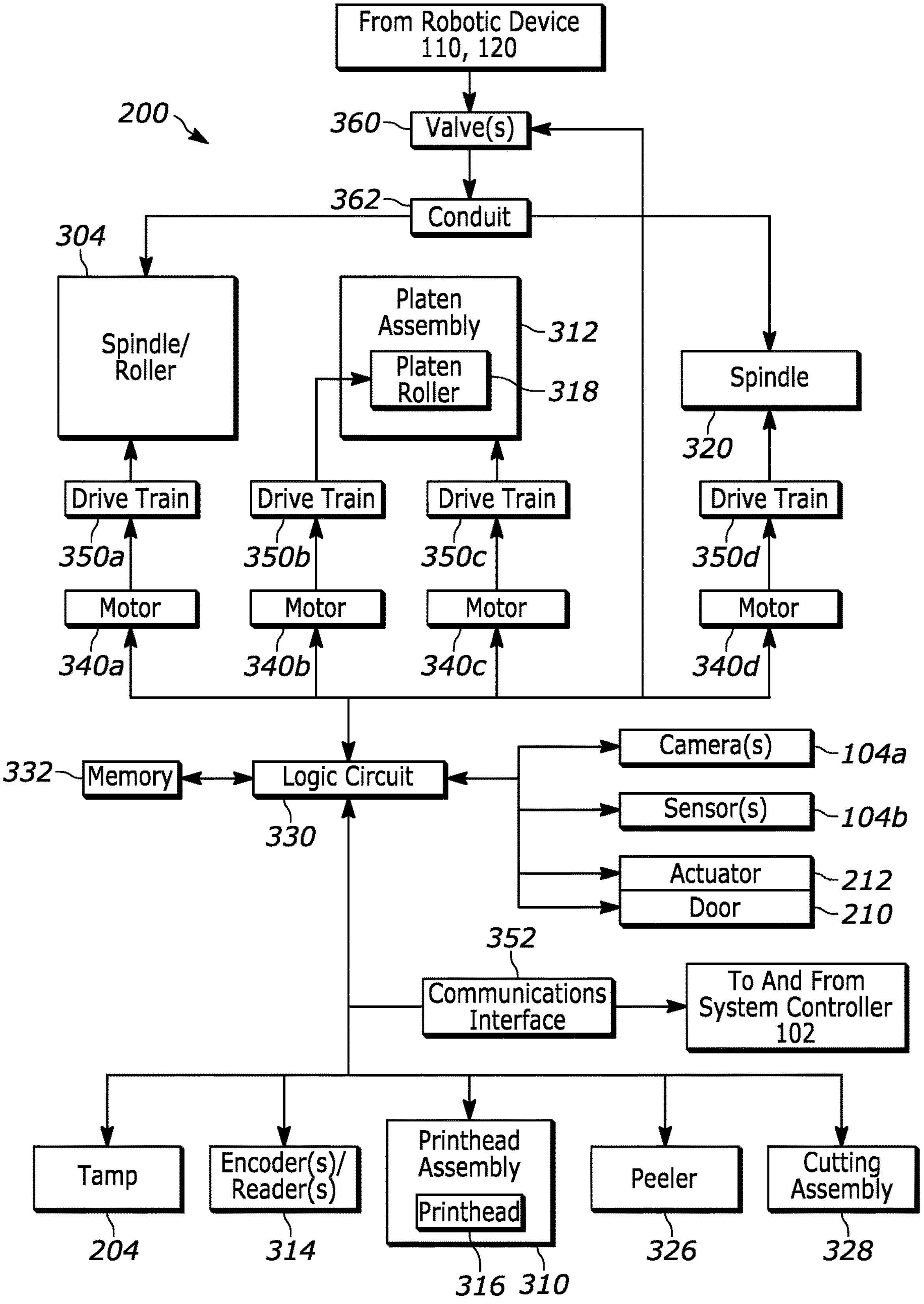
FIG. 3 is a block diagram of an embodiment of the media applicator of FIG. 2 in accordance with embodiments of the present disclosure.

FIG. 3 illustrates an example block diagram for an embodiment of the media applicator 200 that can be embodied as the media applicators 108*a* and/or 108*b* shown in FIG. 1. As shown in FIG. 3, the media applicator 200 can include: a media payout roller or a media supply spindle 304 that can hold or support a media spool or media roll; a printhead assembly 310 including a printhead 316; a moveable platen assembly 312 including a platen roller 318; a RFID/NFC encoder 314; a take-up roller or spindle 320; a peeler 326; a cutting assembly 328; the tamp 204; as well as electronics and drive components including, for example, a logic circuit 330 (e.g., such as a processor, FPGA, ASIC, or other logic circuit); a non-transitory computer-readable medium, e.g., in the form of memory 332; at least one of the one or more of the cameras 104*a*; at least one of the one or more of the sensors 104*b*; motors 340*a-d*; drive trains 350*a-d*; a communications interface 352; the actuator 214 operatively coupled to the access door 210; and/or valves 360 operative coupled to conduit 362 and the spindles 304 and/or 320 to output a flow air under pressure from the spindles 304 and/or 320 to aid in discarding remnants of media components after the supply of media has been depleted. In one example, the peeler 326 can form part of the platen assembly 312. The drive trains 350*a-d* can include driveshafts, gears, belts, clutches, and/or other components configured to transfer motion from the motors 340*a-d* to the spindle 304, the platen roller 318, the platen assembly 312, and/or the spindle 320.

The logic circuit 330 can send instructions and/or data to and/or receive instructions and/or data from the system controller 102 (e.g., via the communications interface 352). The logic circuit 330 can execute code stored in the memory 332 to control the components of the media applicator 200 to perform one or more media processing functions, for example, in response to instructions and/or data received from the system controller 102. As one example, the logic circuit 330 can execute code in the memory 332 to control a rotation of the media supply spindle 304 about a media supply spindle axis of rotation via the motor 340*a* and drive train 350*a*, to control a rotation of the platen roller 318 about a platen roller axis of rotation via the motor 340*b* and the drive train 350*b*, to control a rotation of the platen assembly 312 to move between a media processing position and a media loading position via the motor 340*c* and the drive train 350*c*, and/or to control a rotation of the take-up spindle 320 about a take-up spindle axis of rotation via the motor 340*d* and the drive train 350*d* to process and/or dispense media from the media applicator 200. The logic circuit 330 can also execute code in the memory 332 to write data to and/or read data from RFID/NFC tags in and/or associated with the media using the encoder/readers 314, render indicia on the media using the printhead 316, peel media from a liner using the peeler 326, and/or cut the media using the cutting assembly 328. In one example, the media applicator 200 may be devoid of the logic circuit 330 and a logic circuit (e.g., a processor) of system controller 102 performs the functions and operations of the logic circuit 330 described herein.

The logic circuit 330 can receive signal(s) output by the sensor(s) 104*b* and/or images output by the camera(s) 104*a* and can execute code in the memory 332 to determine, based on the signal(s) and/or image(s), that the media in the media applicator 200 has been exhausted or that less than a specified amount of media remains in the media applicator 200. Alternatively, or in addition, the logic circuit 330 can execute code in the memory 332 to determine that the media in the media applicator 200 has been exhausted or that less than a specified amount of media remains in the media applicator 200 based on information about the media when it is loaded in the media applicator and information about the consumption of the media by the media applicator 200. As an example, a quantity of the media remaining in the media applicator 200 can be calculated or estimated by the logic circuit 330 based on, for example, on an initial quantity of media loaded into the media applicator 200, and a quantity of media that has been dispensed by the media applicator 200, which may be based on determined on one or more of a number of print jobs executed by the media applicator 200, a number of revolutions of the payout spindle 304 (e.g., as determined by a number of steps of the motor 340*a*, as measured by one of the sensors 104*b* in the3 form of a rotary encoder, etc.), a print speed (e.g., as determined based on a speed at which the platen roller 318 is driven by the motor 340*b* and drive train 350*b*), a starting diameter of a media roll, a thickness of the media, a length of media units dispensed by the media applicator 200, and/or other information. In response to determining that the media has been exhausted or that less than a specified amount of media remains in the media applicator, the logic circuit 330 can communicate with the system controller 102 via the communications interface 352 to indicate that the media has been exhausted or that less than a specified amount of media remains in the media applicator 200 and the system controller 102 can control the robotic device to which the media applicator 200 is attached (e.g., the robotic device 110 or 120) to move the media applicator 200 into position to facilitate replenishment of the media via the media replenishment system 112, e.g., shown in FIG. 1.

In another example, the system controller 102 can receive signal(s) output by the sensor(s) 104*b* and/or images output by the camera(s) 104*a* and can determine, based on the signal(s) and/or image(s), that the media has been exhausted or that less than a specified amount of media remains in the media applicator 200. In response to determining that the media has been exhausted or that less than a specified amount of media remains in the media applicator 200, the system controller 102 can control the robotic device to which the media applicator 200 is attached (e.g., the robotic device 110 or 120) to move the media applicator 200 into position to facilitate replenishment of the media via the media replenishment system 112, e.g., shown in FIG. 1, and can communicate with the media applicator 200 (e.g., the logic circuit 330 via the communications interface 352). In response to the communication from the system controller 102, the logic circuit 330 can be configured to control the media applicator 200 to prepare the media applicator 200 for receiving a supply of media. Alternatively, the system controller 102 can be configured to control the media applicator 200 to prepare the media applicator for receiving a supply of media for embodiments in which the media applicator is devoid of the logic circuit 330.

When a new supply of media will be installed in the media applicator 200 (e.g., when it is determined that the currently loaded supply of media has been or will be exhausted or as required based on the objects to be labeled), the logic circuit 330 and/or system controller 102 can control the media applicator 200 to prepare the media applicator 200 for receiving a supply of media by controlling the platen assembly 312 (e.g., via the motors 340*c* and drive train 350*c*) and/or the access door 210 (e.g., via the actuator 212) to move from a media processing position, in which the media applicator 200 is configured to print, encode, and/or dispense media, to a media installation position, in which the media applicator 200 is configured to receive a supply of media. As one example, the logic circuit 330 and/or system controller 102 can control the actuator 212 to open the door 210. As another example, the logic circuit 330 and/or system controller 102 can cause the platen assembly 312 to move between the media processing position in which the platen roller 318 and the printhead 316 are configured to form a nip for processing media and a media loading position in which the platen assembly 312 and platen roller is moved away from the printhead assembly 310 and/or the printhead 316 to facilitate installation of a supply of media on the spindles 304 and/or 320 and to facilitate a length of media passing between the printhead 316 and the platen roller 318. In the media loading position, the platen assembly 312 can be positioned laterally between the media payout spindle 304 and the take-up spindle 320.

After the media applicator 200 is loaded with the supply of media, the logic circuit 330 and/or the system controller 102 can control the platen assembly 312 (e.g., via the motor 340*d* and the drive trains 350*d*) to move from the media loading position to the media processing position to route the media under along a media path to enable the media applicator to print, encode, and/or dispense media. The logic circuit 330 and/or system controller 102 can also control the door 210 (e.g., via the actuator 212) to move from the open position to the closed position.

As indicated above, FIG. 3 is provided as an example of a media applicator. Other examples may differ from what is described with regard to FIG. 3. The number and arrangement of devices/components shown in FIG. 3 are provided as an example. In practice, there may be additional devices/components, fewer devices/components, different devices/components, or differently arranged devices/components than those shown in FIG. 3. Furthermore, two or more devices/components shown in FIG. 3 may be implemented within a single device/component, or a single device/component shown in FIG. 3 may be implemented as multiple, distributed devices/components. Additionally, or alternatively, a set of devices/components (e.g., one or more devices/components) shown in FIG. 3 may perform one or more functions described as being performed by another set of devices/components shown in FIG. 3.

FIGS. 4A-F illustrate an example arrangement 400 of components in an interior of an embodiment of the media applicator 200 of FIG. 2 and with the housing omitted. As shown in FIGS. 4A-F, a chassis 402 supports at least some of the components for processing a supply of media along a media path 432. For example, the chassis 402 can support the media supply spindle 304 that can hold or support a media spool or media roll (e.g., media 430); the printhead assembly 310 including the printhead 316; the platen assembly 312 including the platen roller 318; the RFID/NFC encoder 314; the take-up roller or spindle 320; the peeler 326; the cutting assembly 328; dancer arms 424; and media guides 434, as well as the electronics and drive components, e.g., the logic circuit 330; the memory 332; motors 340*a-d*; and drive trains 350*a-d*, shown in FIG. 3. The chassis 402 can also support at least one of the cameras 104*a* and/or at least one of the sensors 104*b* to aid in aligning the media applicator 200 with a media replenishment system (e.g., the media replenishment system 112). The dancer arms 424 and the media guides 434 are configured to engage media 430 at one or more positions along the media path 432. While the example arrangement has been illustrated as being configured for direct thermal printing, embodiments of the present disclosure may alternatively be configured for thermal transfer printing, where the arrangement 400 can include ribbon supply and ribbon take-up spindles configured to support a thermal ink ribbon to facilitate thermal transfer printing.

Figure 4A:
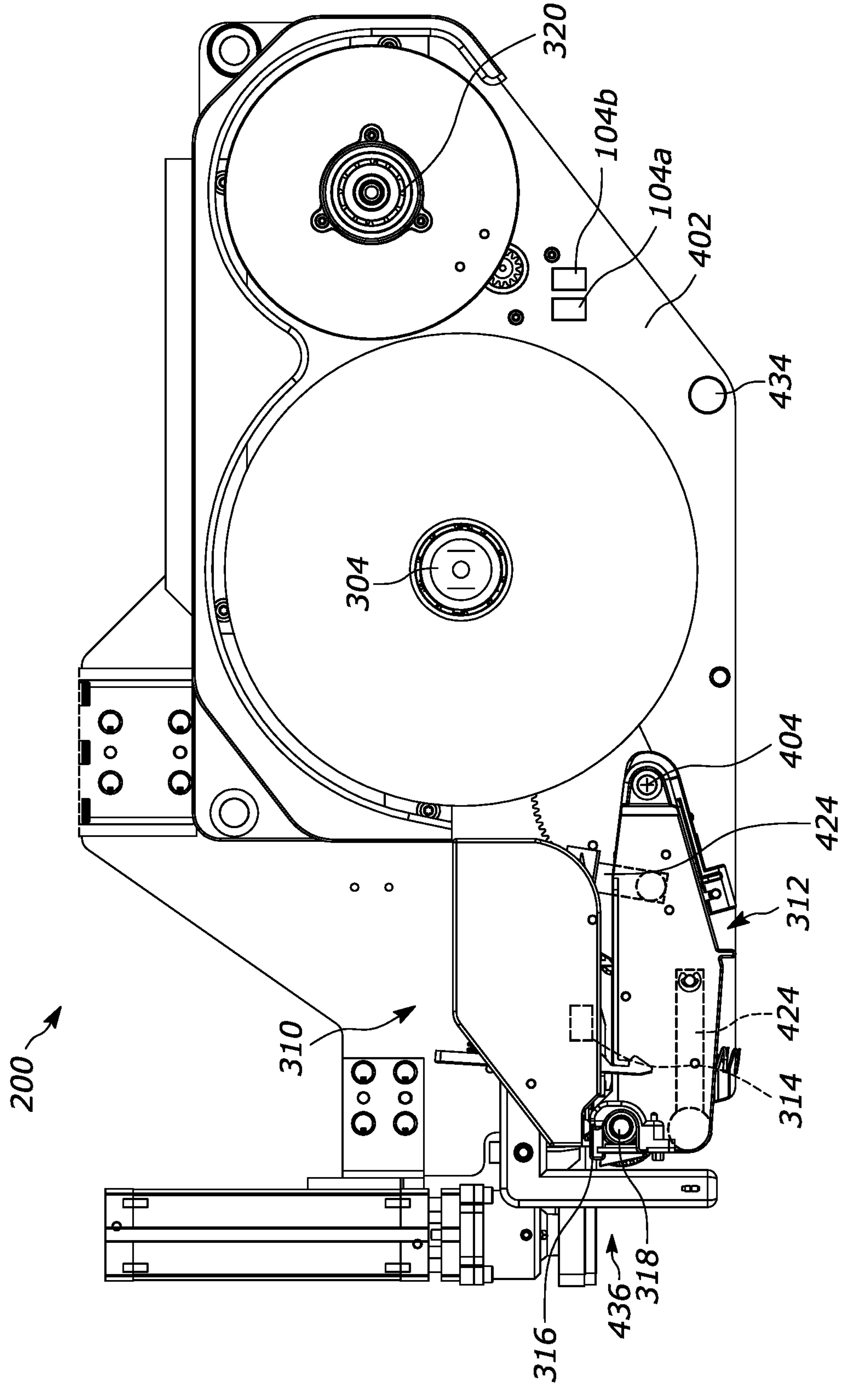
FIGS. 4A-F illustrate an interior arrangement of an embodiment of the media applicator of FIG. 2 with the housing omitted in accordance with embodiments of the present disclosure.
Figure 4B:
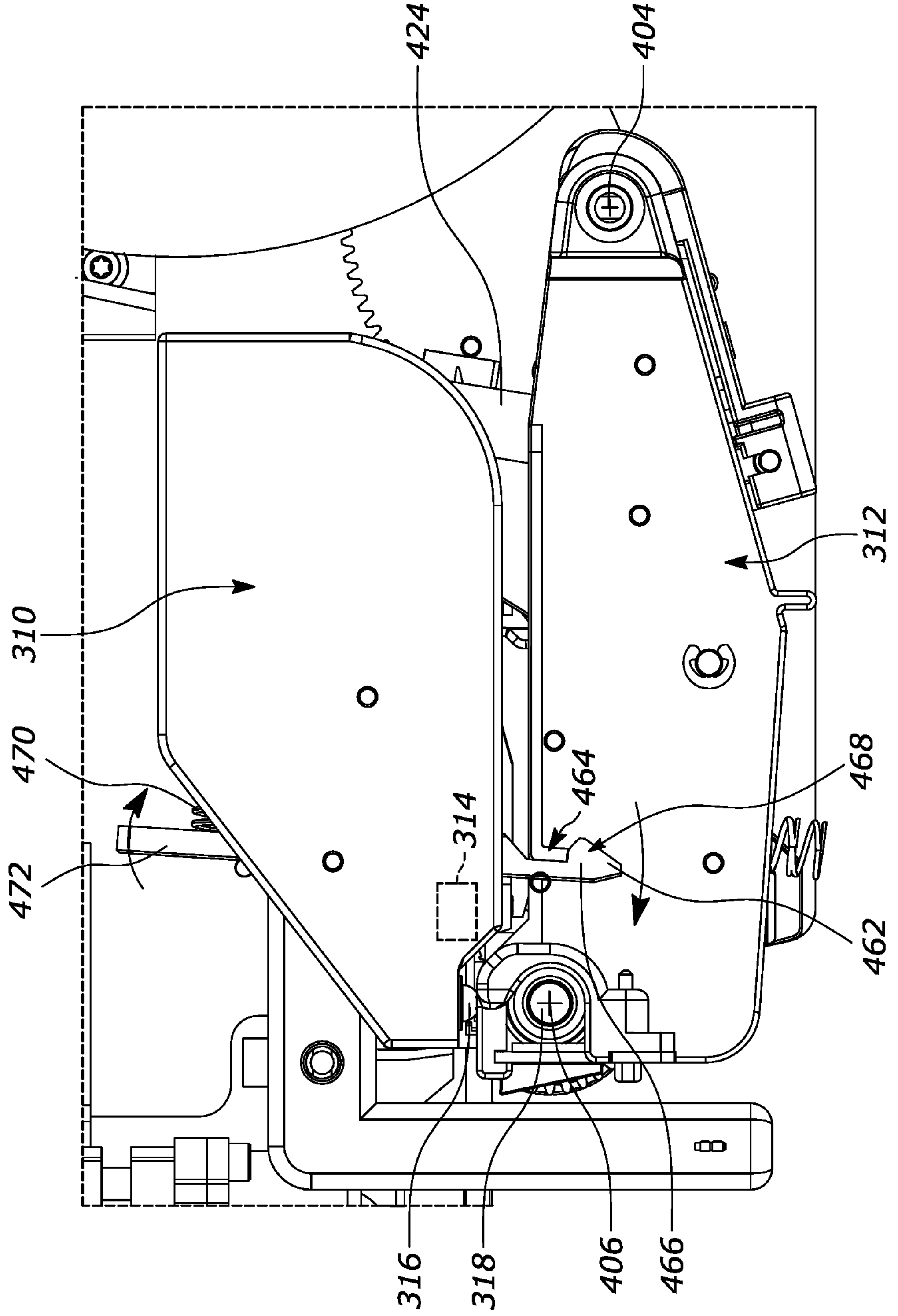
Figure 4C:
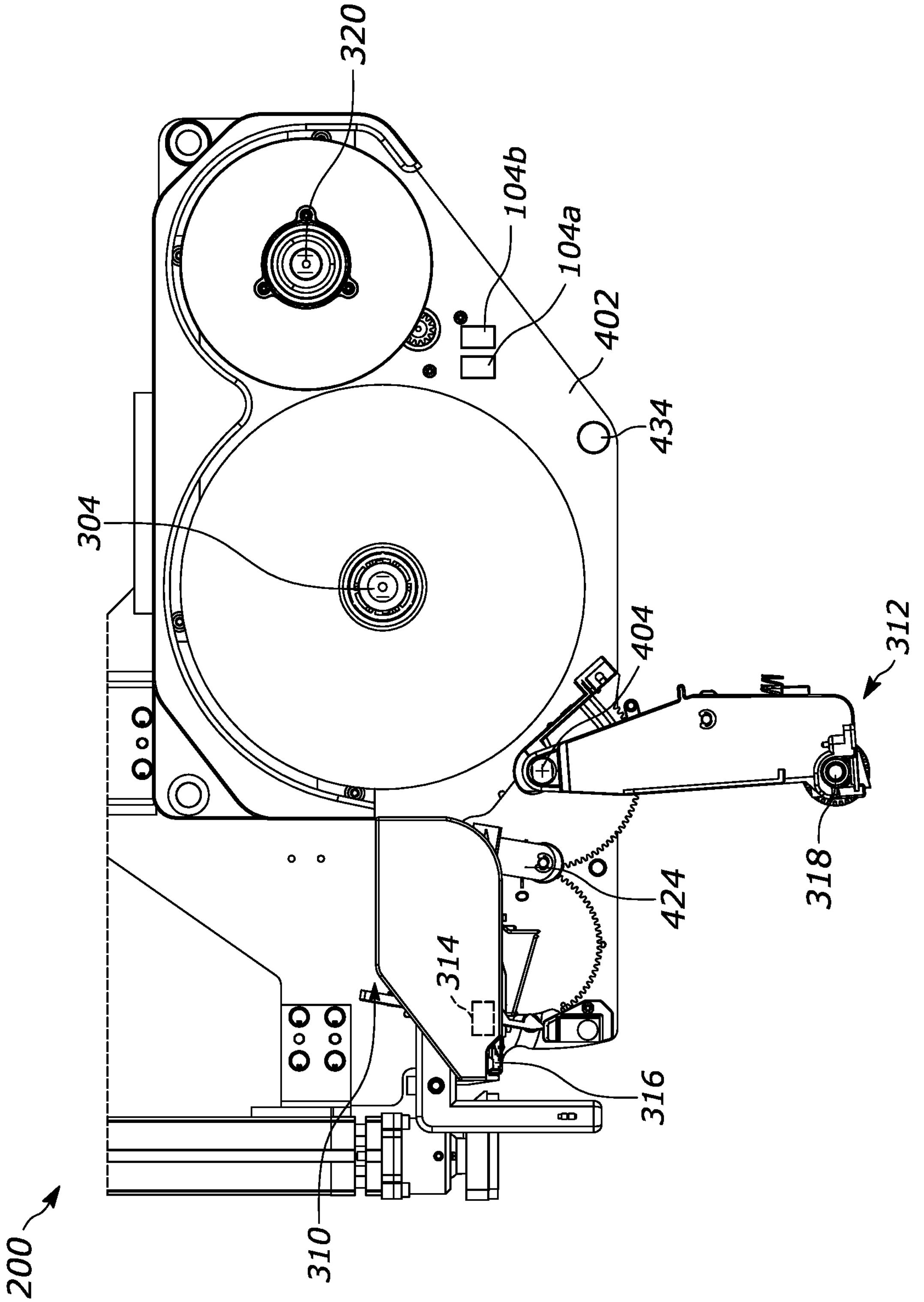
Figure 4D:
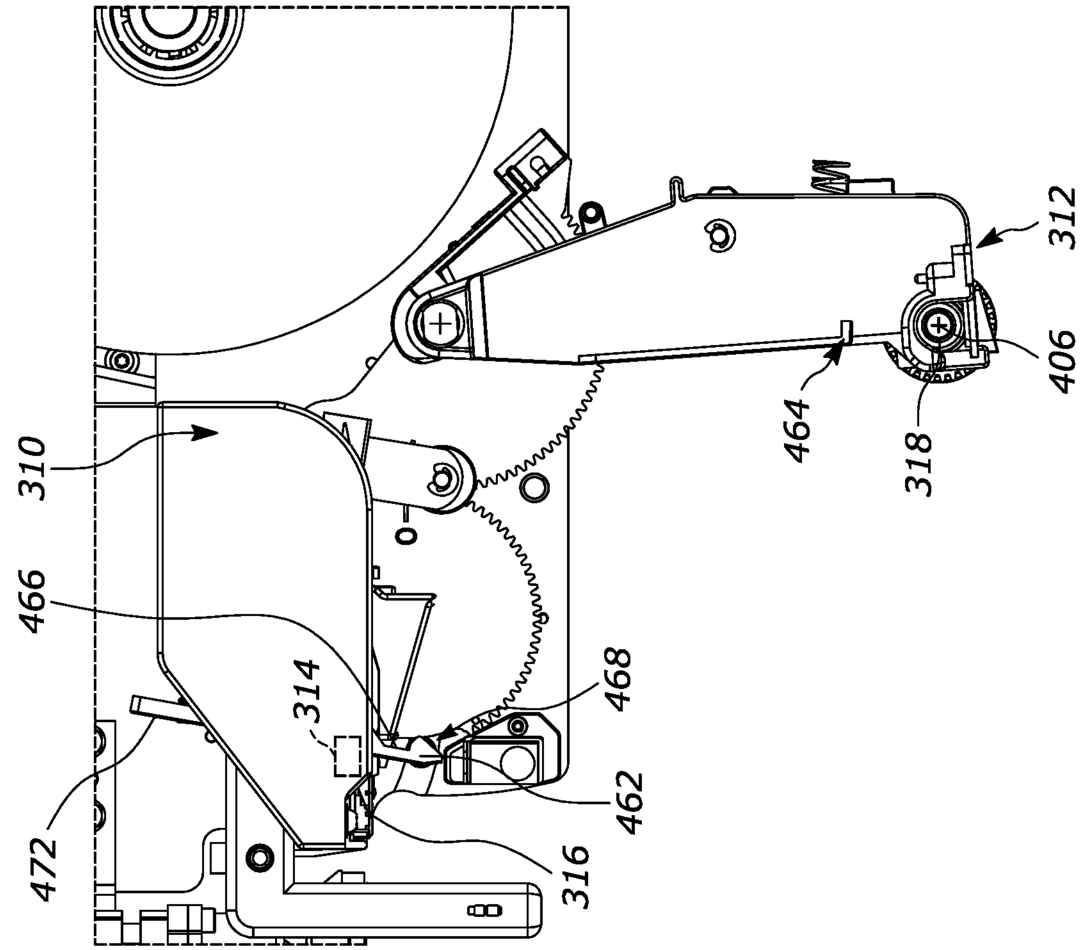

As shown in FIGS. 4A-F, the platen assembly 312 can move between the media processing position (e.g., shown in FIGS. 4A, 4B, and 4F) and the media loading position (e.g., shown in FIGS. 4C-E) to facilitate autonomous replenishment of media, e.g., via an interaction with the media replenishment system 112 shown in FIG. 1. As an example, when the platen assembly 312 is in the media processing position, as shown in FIGS. 4A-B, the platen assembly 312 is positioned so that the printhead 316 and platen roller 318 are opposingly spaced from each other to form a nip. When the platen assembly 312 is in the media processing position, the platen assembly 312 extends generally laterally or horizontally (e.g., relative to the orientation shown in FIGS. 4A-B). The platen assembly is independently moveably relative to the access door 210. When a new supply of media is to be installed, the platen assembly 312 can be driven (e.g., via motor 340*c* and drive train 350*c*) to rotate in a first direction about an axis of rotation 404 (e.g., counterclockwise relative to the orientation shown in FIGS. 4A-E) from the media processing position as shown in FIGS. 4A-B to the media loading position as shown in FIGS. 4C-D. When the platen assembly 312 is in the media loading position, the platen assembly 312 extends generally downward (e.g., relative to the orientation shown in FIGS. 4C-D) and the platen roller 318 is positioned away from the printhead 316 such that the platen roller 318 no longer opposes the printhead 316 and no longer forms a nip with the printhead 316. In one example, the platen assembly 312 can rotate about the axis of rotation 404 between approximately 25 degrees to approximately 180 degrees from the media processing position to the media loading position. In one example, the platen assembly 312 can rotate about the axis of rotation 404 between approximately 45 degrees and approximately 135 degrees from the media processing position to the media loading position. In one example, the platen assembly 312 can rotate about the axis of rotation 404 between approximately 80 degrees and approximately 115 degrees from the media processing position to the media loading position.

In one example embodiment, as shown in FIG. 4B, a latch 460 can retain the platen assembly 312 in the media processing position to ensure that a specified distance between the platen assembly 312 and the printhead assembly 310 is maintained within a specified tolerance during operation of the media applicator when the platen assembly 312 is in the media processing position. The latch 460 can include latch arms 462 and latch catches 464. The latch arms 462 can extend downwardly from, and be retained in, the printhead assembly 310 and extend beyond a bottom of the printhead assembly 310 to engage the latch catches 464 of the platen assembly 312. The catches 464 can be formed on opposing sides of the platen assembly 312 (e.g., where the opposing sides of the platen assembly that are transverse to an axis of rotation 406 of the platen roller 318). In one example, the catches 462 can be protrusions extend from the sides of the platen assembly 312. The latch arms 462 can include a notch or recess 466 formed at a distal end 468 of the arms 462 that is configured to capture the catches 464 when the latch arms 462 are in the latched position. The arms 462 can be biased with a biasing force by a biasing member 470, e.g., a spring member, that biases the latch arms 462 towards the latched position to engage the catches 464 (e.g., the distal end 468 is biased to the right in the orientation illustrated in FIGS. 4B and 4D). When the platen assembly 312 begins to transition to the media loading position, as shown in FIG. 4D, biasing force exerted on the latch arms 462 can be overcome by a counterforce to urge the arms 462 to move to the unlatched position (e.g., to the left in the orientation illustrated in FIGS. 4B and 4D) to allow the platen assembly to move from the media processing position (FIG. 4B) to the media loading position (FIG. 4D). An example mechanism for driving the latch arms 462 between the latched position and the unlatched position and moving the platen assembly between the media process position and the media loading position is describe herein, e.g., with reference to FIGS. 5A-E. In one example, the latch arms may also be moved from the latched position to the unlatched position by manual manipulation of a lever 472 that is operatively coupled to the latch arms 462 (e.g., by urging the lever 472 to right in the orientation shown in FIG. 4B, overcoming the biasing force of the biasing member 470.

Figure 4E:
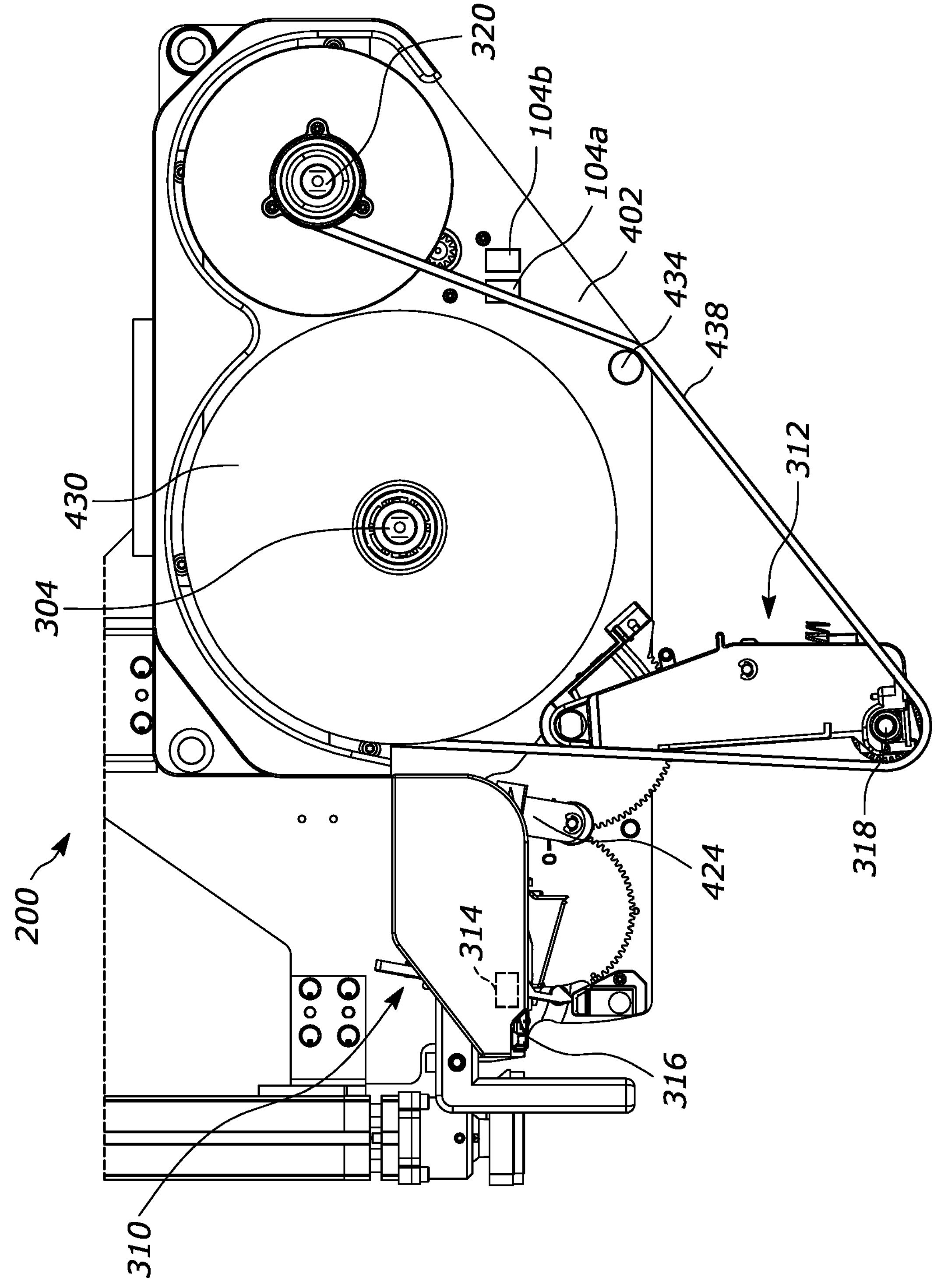
Figure 4F:
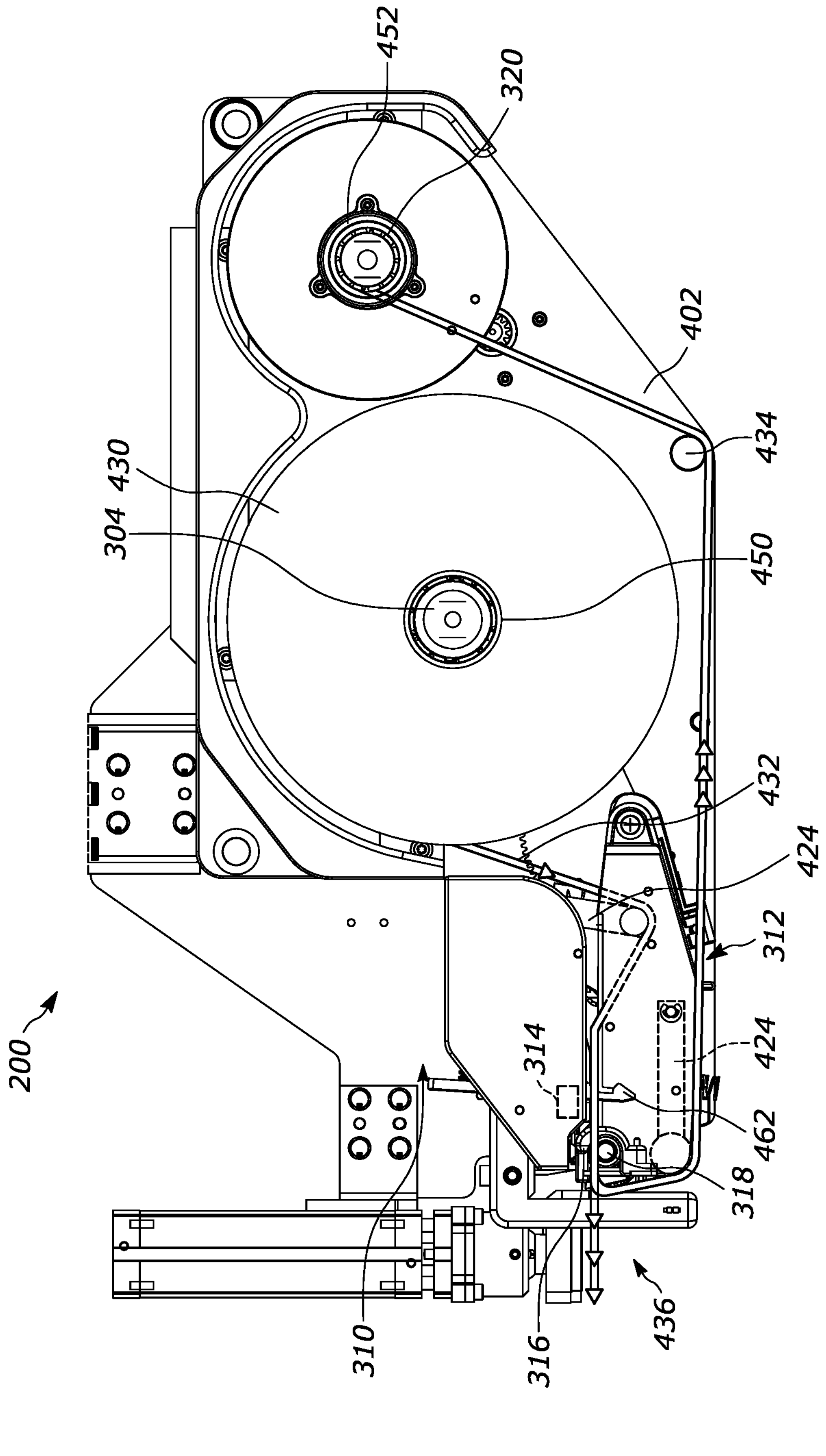

In the media loading position, the media 430 from the media replenishment system 112 can be autonomously received in the media applicator as shown in FIG. 4E. For example, the media 430 can include a media roll wrapped about a first core 450 and a second core 452 that can have a terminal end of the media and/or the liner of the media 430 attached thereto. The first core 450 can be received on the media supply spindle 304 and the second core 452 can be received on the take-up spindle 320. The cores 450 and 452 of the media can be secured on the spindles 304 and 320, respectively such that the media generally does not freely rotate relative to the spindles 304 and 320. Rather, the cores 450 and 452 can be “locked” to the spindles 304 and 320, respectively such that the spindles 304 and 320 and the cores 450 and 452 rotate in unison. A length of media 438 can be dispensed from the media roll prior to the media 430 being received by the media applicator and the cores 450 and 452 to can be positioned a specified distance apart from each other, where the specified distance can correspond to a distance between the spindles 304 and 320 of the media applicator. The distance between the cores 450 and 452 and the length of media 438 dispensed from the media roll prior to installation in the media applicator can enable the media 430 to be received by the spindles 304 and 320 with the length of media extending around or under/below the platen assembly 312 and the media guide 434 (relative to the orientation shown in FIG. 4E). After the media 430 is installed in the media applicator 200, the platen assembly 312 can return to the media processing position (e.g., so that the platen roller 318 forms the nip with the printhead) and the latch arms 462 can move back to the latched position to retain the platen assembly in the media processing position as shown in FIG. 4F.

When the platen assembly 312 returns to the media processing position, at least a portion of the media 430 is positioned between the nip formed by the printhead 316 and the platen roller 318 and the media 430 is held along the media path 432 and the media applicator can be controlled to dispense the media 430. For example, the platen roller 318 can be driven by the motor 340*b*, e.g., via the platen drive train 350*b*, to rotate about an axis of rotation of the platen roller 318 (platen axis of rotation) at a specified platen or print speed to pull the media 430 along the media path 432.

To maintain tension on the media 430 as it is pulled by the platen roller 318 along the media path 432, the motor 340*a* can drive, e.g., via the media payout drive train 350*a*, the spindle 304 to rotate about an axis of rotation (a payout spindle axis of rotation) at a specified payout speed and/or with a specified torque to dispense the media while maintaining tension on the media 430 along the media path 432 between the media supply on the media supply spindle 304 and the nip formed between the printhead 316 and the platen roller 318. As the media passes the encoder 314, the encoder 314 can write data to and/or read data from an RFID/NFC tag in the media (for embodiments of the media that include RFID/NFC tags) and/or the printhead 316 can render indicia on the media 430. The take-up spindle 320 can also be driven to maintain tension on the liner of the media 430, as the platen roller 318 outputs the media downstream along the media path 432, the motor 340*d* can drive the spindle 320, e.g., via the media take-up drive train 350*d*, to rotate about an axis of rotation (a take-up spindle axis of rotation) at a specified take-up speed and/or with a specified torque to maintain tension on the liner of media 430 along the media path 432 between the nip formed between the printhead 316 and the platen roller 318 and the media take-up spindle 320.

Once printed and/or encoded, the processed media can be peeled from the liner by the peeler 326, cut by a cutting assembly 328, output from a media outlet 436, and/or applied on an object via the tamp 204, while the liner separated from the media can be wound about the take-up spindle 320. For example, the tamp 204, may apply media that is output from the media outlet 436 by contacting or pressing the media to an object via an actuation of the tamp 204. In some examples, individual media elements can be held on a continuous web of media via the liner such that the cutter assembly 328 is not required or can be disabled.

As indicated above, FIGS. 4A-F are provided as example interior arrangements of a media applicator. Other examples may differ from what is described with regard to FIGS. 4A-F. The number and arrangement of devices/components shown in FIGS. 4A-F are provided as an example. In practice, there may be additional devices/components, fewer devices/components, different devices/components, or differently arranged devices/components than those shown in FIGS. 4A-F. Furthermore, two or more devices/components shown in FIGS. 4A-F may be implemented within a single device/component, or a single device/component shown in FIG. 4A-F may be implemented as multiple, distributed devices/components. Additionally, or alternatively, a set of devices/components (e.g., one or more devices/components) shown in FIGS. 4A-F may perform one or more functions described as being performed by another set of devices/components shown in FIGS. 4A-F.

Figure 5A:
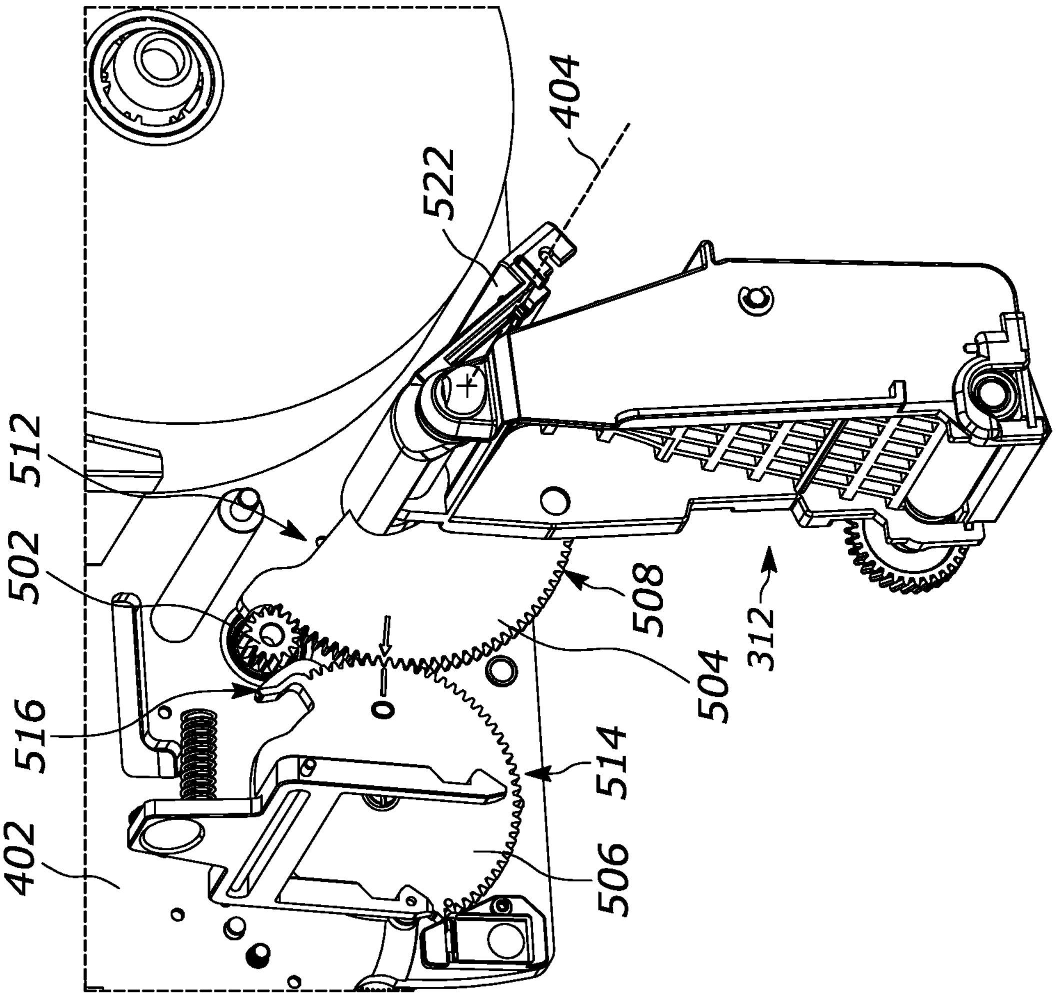
FIGS. 5A-H illustrate an example mechanism for controlling a position of latch arms and a platen assembly in accordance with embodiments of the present disclosure.

FIGS. 5A-H illustrate an example mechanism for controlling a position of the latch arms 462 and the platen assembly 312 of an embodiment of the media applicator 200. Certain components of the media applicator 200 have been omitted from FIGS. 5A-E so that the example mechanism may be more readily observed. As shown in FIG. 5A (with the platen assembly 312) and 5B (omitting the platen assembly 312), a drive gear 502 can extend through a hole in the chassis 402 to engage or mesh with a gear 504, which in turn can engage or mesh with a gear 506. The drive gear 502 can be operatively coupled to the motor 340C (e.g., shown in FIGS. 3 and 6), which can drive the drive gear 502 to rotate, where gears 502 and 504 can form at least a portion of the drive train 350*c* shown in FIG. 3. The platen assembly 312 can be operatively coupled to the gear 504. In the present example, the gears 504 and 506 can be, but are not limited to, sector gears that can limit the rotation of the gears 504 and 506. As an example, teeth 508 of the gear 504 can extend about a perimeter or circumference of the gear 504 between a stop structure 510 and a stop structure 512 and teeth 514 of gear 506 can extend about a perimeter or circumference of the gear 506 between a stop structure 516 and a termination 518 of the teeth 514. The stop structures 510, 512, and/or 516 can prevent the gear 504 from being over-rotated where that the gears 502 and 504 would no longer engage or mesh and/or the gears 504 and 506 would no longer engage or mesh. The stop structure 510 can include a ramped section 520 and/or a plate or flange 522 that extends from the gear. The ramped section 520 can be disposed along the perimeter or circumference of the gear 504 between a termination 524 of the teeth 508 and the flange 522. As an example, the ramped section 520 can increase outwardly in a radial direction relative to the axis of rotation 404 from the termination 524 of the teeth 508 to the flange 522. The flange 522 can extend from the gear 504 (e.g., parallel to the axis of rotation 404 and perpendicular relative to a direction in which the teeth 508 of the gear 504 extend).

The platen assembly 312 can be operatively coupled to the gear 504 via a shaft 526 extending from the gear 504 parallel to, and coaxially relative to, the axis of rotation 404. The shaft 526 can extend through a proximal end 528 of the flange 522. In one example, the platen assembly 312 can also freely rotate relative to the gear 504 about the axis of rotation 404 (or a different axis of rotation) and the flange 522 can limit the rotation of the platen assembly in the counterclockwise direction relative to the orientation shown in FIG. 5A such that when the gear 504 rotates to move the platen assembly 312 from the media loading position to the media processing position, the flange 522 and an associated biasing member (e.g., the biasing member 578 shown in FIGS. 5F-H) urges the platen assembly 312 towards the media processing position and provides a support surface to support the platen assembly 312 when the platen assembly 312 is in the media processing position. Likewise, when the gear 504 rotates to move the platen assembly 312 from the media processing position to the media loading position, the platen assembly 312 can move with, and continue to be supported by, the flange 522. In one example, the biasing member (e.g., biasing member 578 shown in FIGS. 5F-H) can be disposed between the flange 522 and the platen assembly 312 which can exert a biasing force on the platen assembly 312 when the platen assembly 312 is in the media processing position to aid in maintaining a specified distance between the printhead 316 and the platen roller 318 with a specified tolerance when the platen assembly 312 is in the media processing position. Additionally or in the alternative, the biasing member can retain the platen assembly in the media processing position while the gear 504 initially rotates a specified number of degrees. When the gear 504 is rotated so that the platen roller 312 is in the media loading position (as shown in FIGS. 5A-B), the biasing member can push the platen roller 312 to rotate slightly away from the flange 522 as described in more detail herein, e.g., with reference to FIGS. 5F-H.

Figure 5B:
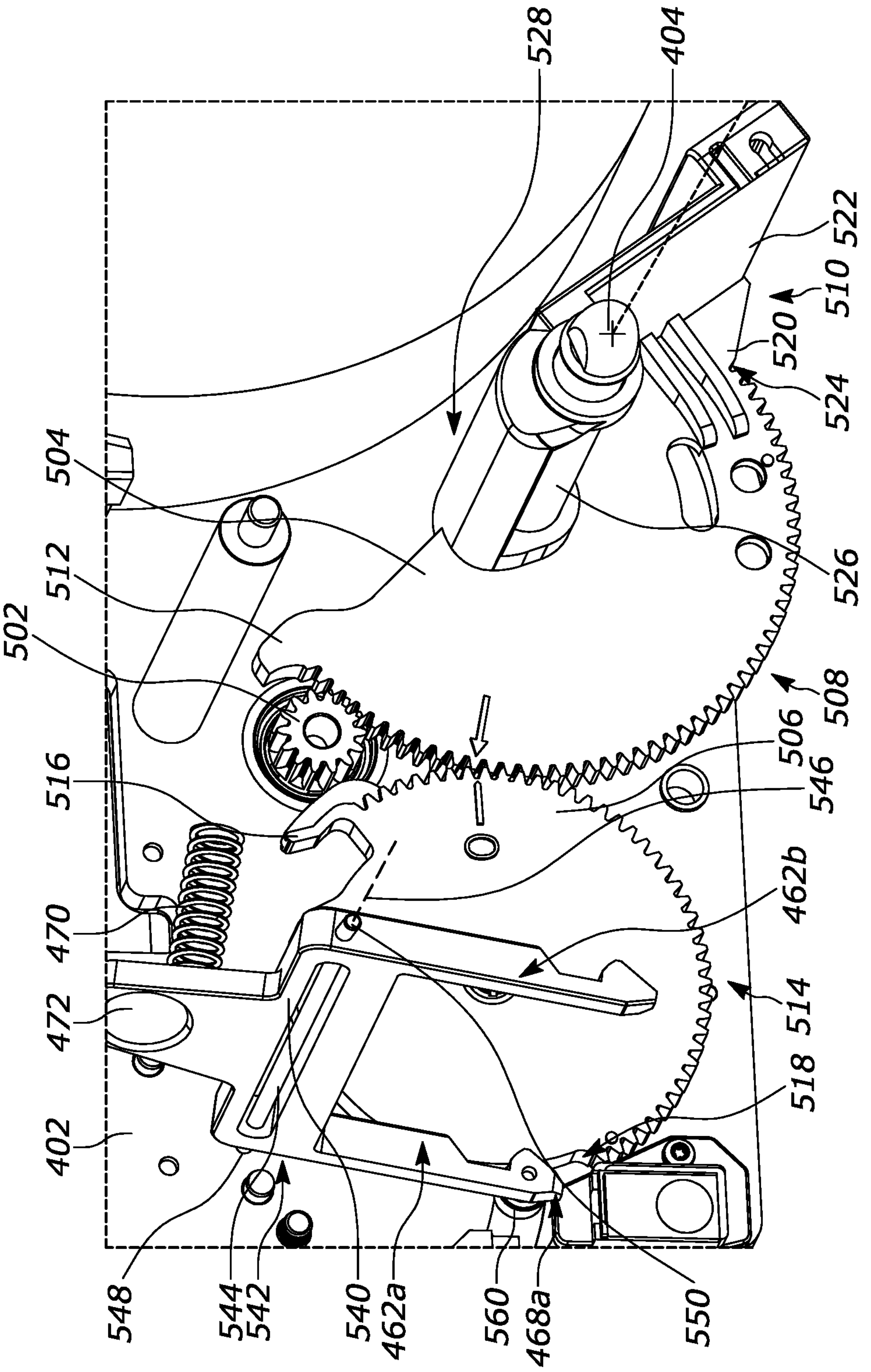

Referring to FIG. 5B, the arms 462 (individually 462*a* and 462*b*) and lever 472 can be operatively coupled via a crossbar 540. For example, in one embodiment, the arms 462*a*, 462*b*, lever 472, and crossbar 540 can be integrally formed. The arm 462*a*, arm 462*b*, and the crossbar 540 can have a generally U-shaped configuration and the arm 462*a*, the arm 462*b*, the lever 472, and crossbar 540 can have a generally Y-shaped configuration where the arms 462*a* and 462*b* extend parallel to each other from the crossbar 540.

The arm 462*a*, the arm 462*b*, the lever 472, and the crossbar 540 can collectively form a latch unit 542. A shaft 544 can extend through the latch unit 542, e.g., through the arms 462*a* and 462*b*, where the shaft 544 defines an axis of rotation 546 about which the latch unit 542 can rotate. A proximal end 548 of the shaft 544 can be supported by the chassis 402 and a distal end 550 of the shaft 544 can be supported by a portion of the printhead assembly 310 (e.g., a side wall of the printhead assembly 310). The latch unit 542, the shaft 544, and the spring 470 can form a portion of the printhead assembly 310 (shown in FIGS. 4A-F) and are shown in FIGS. 5A-E without the remainder of the printhead assembly 310 so that an operation of the latch unit 542 in cooperation with the gears 502, 504, and 506 may be more readily observed. A first end of the biasing member 470 can terminate and be operatively coupled to the latch unit 542 (e.g., to the lever 470) and a second opposing end of the biasing member 470 can terminate and be operatively coupled to a fixed portion of the printhead assembly 310 such that the biasing member 470 exerts the biasing force against the level causing the latch unit 542 to rotated about the axis of rotation 546 in a counterclockwise direction relative to the orientation illustrated in FIG. 5B absent a counterforce that overcomes the biasing force of the biasing member 470.

A guide member 560 can be operatively coupled to the distal end 468*a* of the arm 482*a* and can be configured to engage a toothless edge 562 of the gear 506 along the perimeter or circumference of the gear 506 that does not include the teeth 514 between the stop member 516 and the termination 518 of the teeth 516 (on an opposite of the gear 506 from teeth 514). A radial distance from an axis of rotation 564 of the gear 506 to the toothless edge 562 of the gear 506 can vary along the toothless edge 562 forming a radial cam or cam plate and the guide member 560 can follow or ride along the toothless edge 562 such that rotation of the gear 506 can cause a radial distance of the guide member 560 to vary (e.g., the guide member 560 moves in a plane perpendicular to the axis of rotation 564 of the gear 506), which in turn can generate a varying counterforce on the latch unit 542 (e.g., via the arm 462*a*). Depending on the position of the gear 506, the counterforce on the latch unit 542 can rotate the latch unit 542 (including the arms 462*a-b*) about the axis of rotation 564 overcoming the biasing force of the biasing member 470 and the arms 462*a* and 462*b* can move from the latched position to the unlatched position.

Figure 5C:
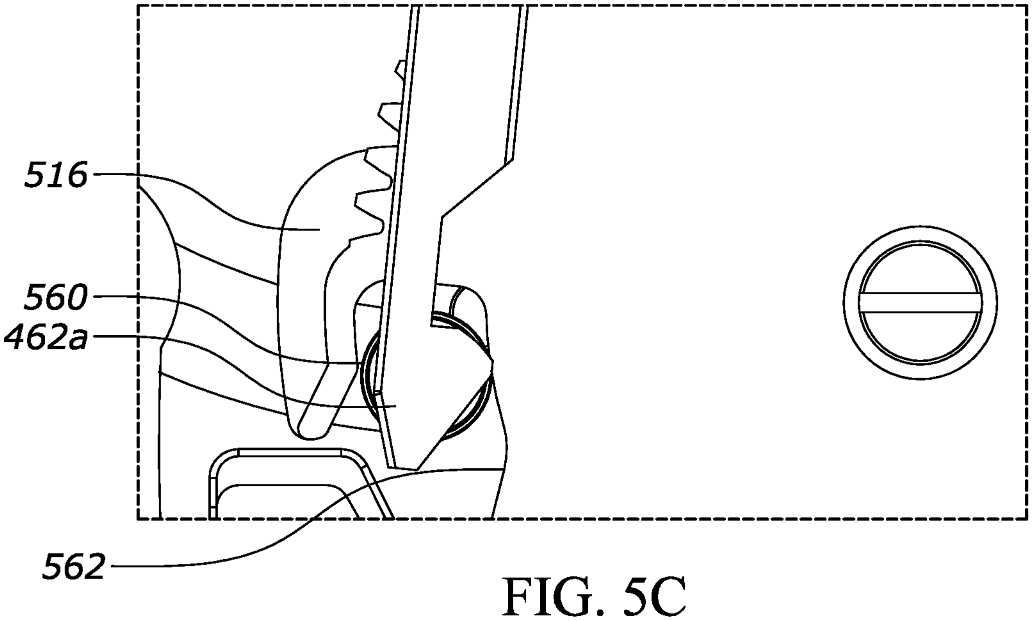
Figure 5D:
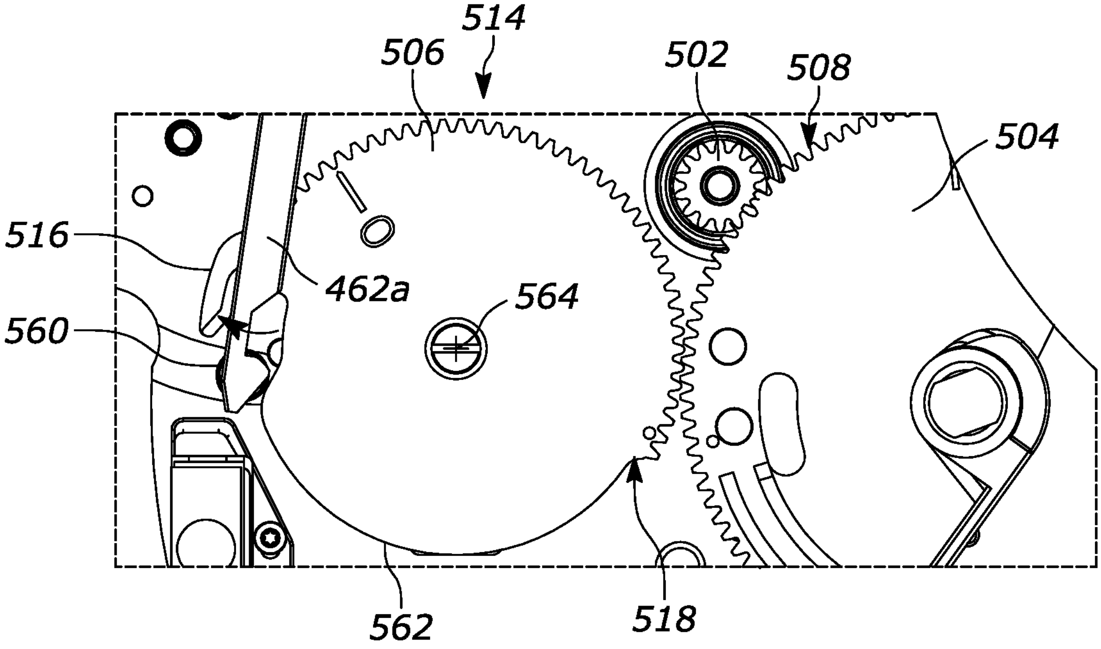
Figure 5E:
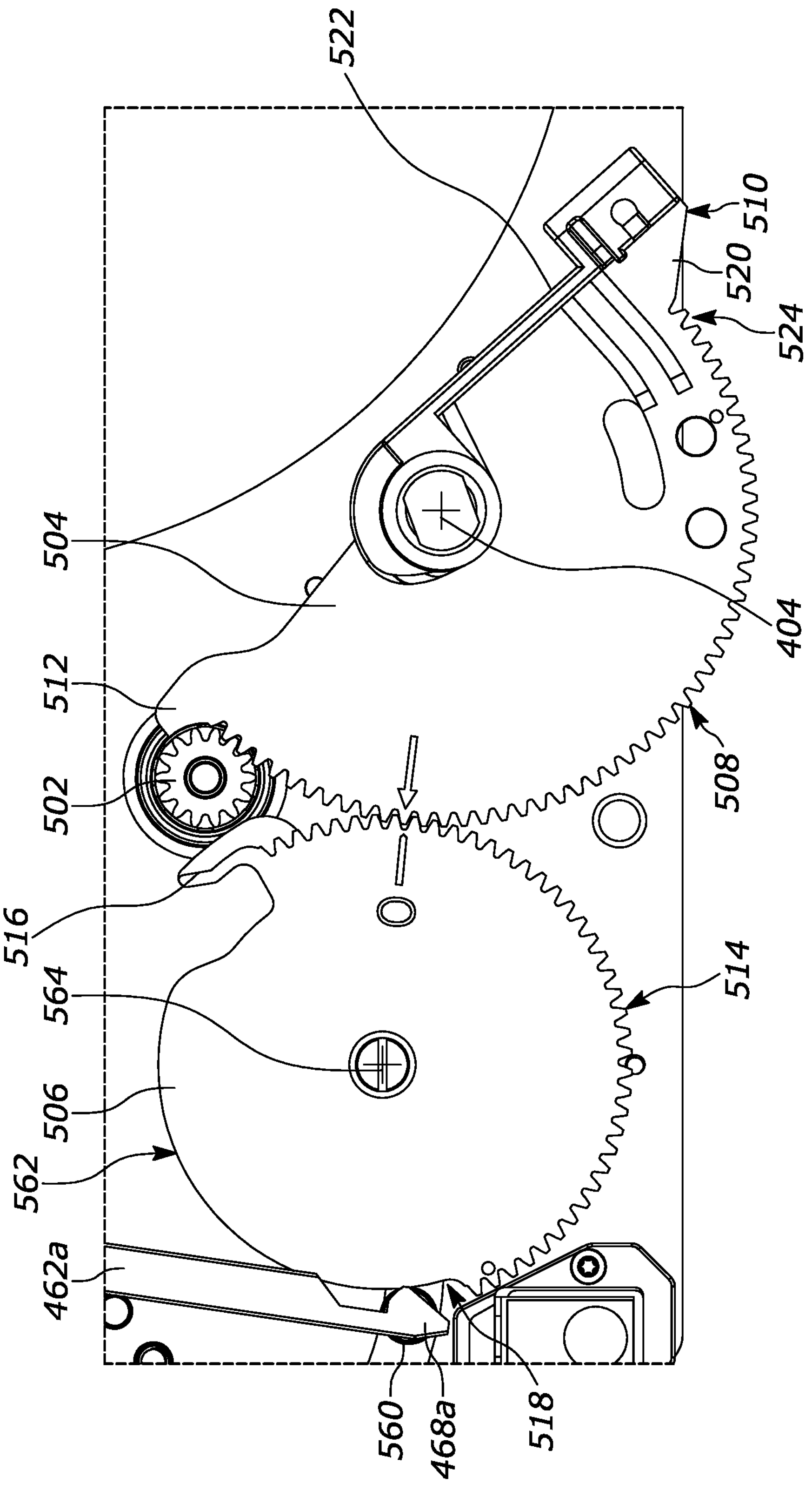

As an example, referring to FIGS. 5C, when the platen assembly is in the media processing position, the guide member 560 can rest against the stop member 516 and between the stop member 516 and the toothless edge 562. As the gear 504 begins to rotate (driven by the gear 502), the gear 506 also begins to rotate causing the guide member 560 to ride along the cam, which in turn causes the arms 462*a* and 462*b* to move from the latched position to the unlatched position as shown in FIG. 5D. The gear 502 can continue to drive the gears 504 and 506 until the platen assembly arrives at the media loading position as shown in FIG. 5E. When the platen assembly is in the media loading position the gear 504 has rotated so that the stop member 512 abuts against or is adjacent to the gear 502 and the arms 462*a-b* can remain in the unlatched position.

Figure 5F:
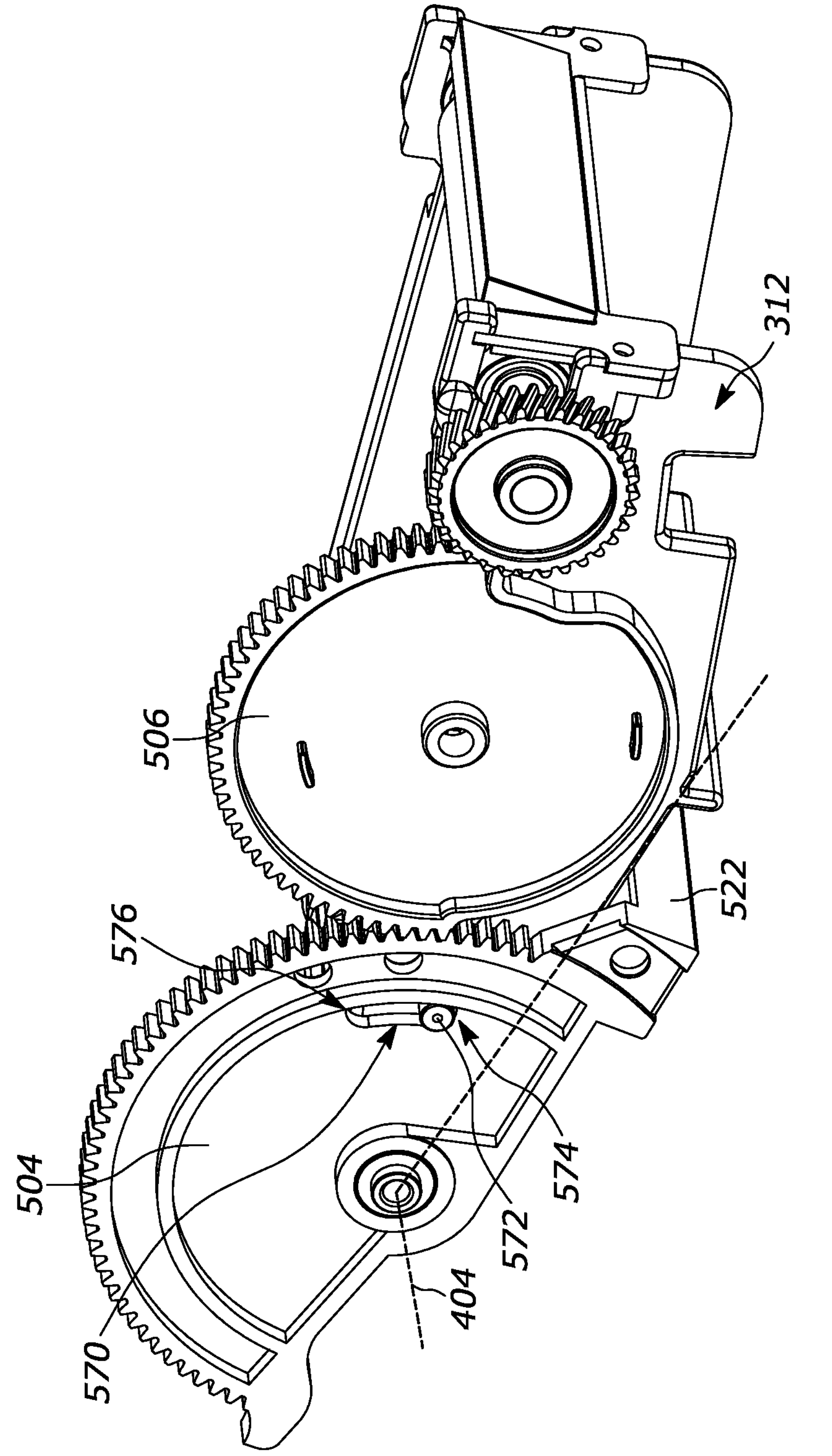
Figure 5G:
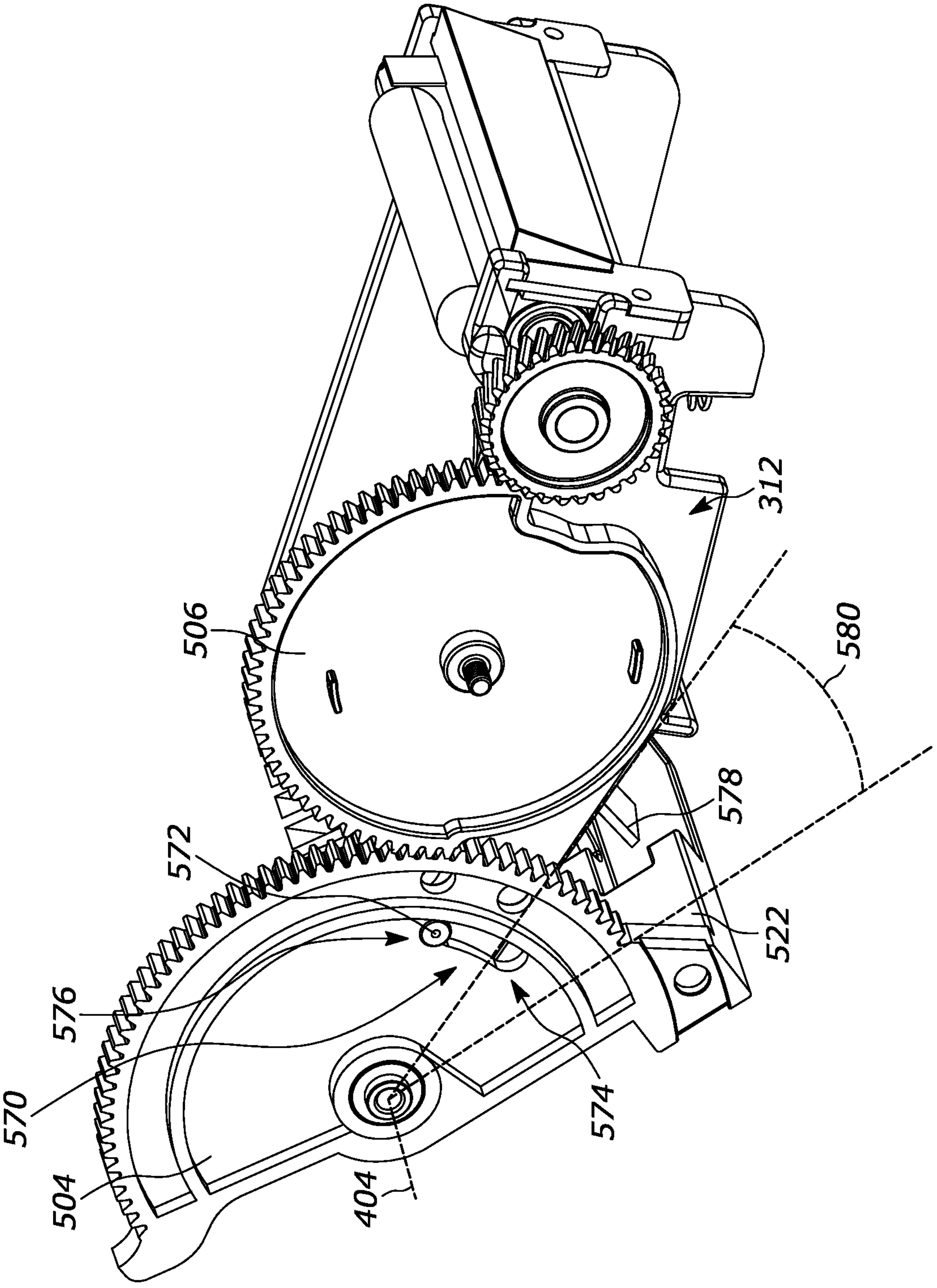
Figure 5H:
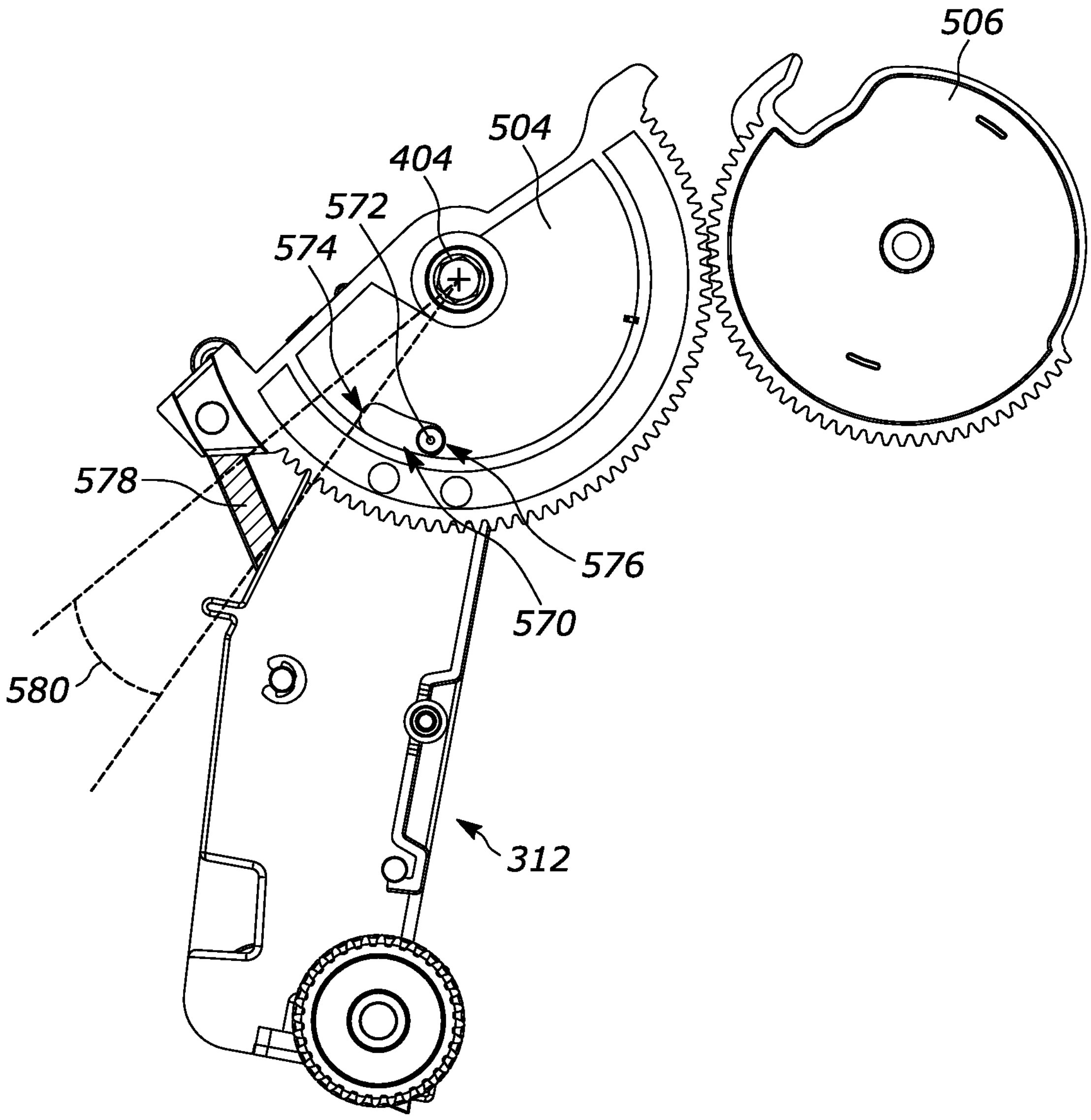

Referring to FIGS. 5F-H, the rotation of the platen assembly 312 relative to the gear 504 can be limited. As an example, the gear 504 can include a slot 570 and the platen assembly can include a projection 572, such as a shaft or pin, that extends into the slot 570 such that the rotation of the platen assembly 312 relative to the gear 504 is limited by first and second ends 574 and 576 of the slot 570. As described herein, the biasing member 578 can cause the platen assembly 312 to rotate away from the flange 522. The slot 570 can have a curvature that generally corresponds to the curvature of the edge of the gear 504 including the teeth 508. The slot 570 can allow the platen assembly 312 to rotate about the center axis 404 relative to the flange 522 extending from the gear 504 by an angle 580 in response to a force exerted on the platen assembly 312 by the biasing member 578. In one example, the angle 580 that the slot 570 can allow the platen assembly 312 to rotate is between approximately five (5) degrees and approximately thirty (30) degrees about the center axis 404 relative to the flange 522 extending from the gear 504. In one example, the angle 580 that the slot 570 can allow the platen assembly 312 to rotate is between approximately fifteen (15) degrees and approximately twenty-five (25) degrees about the center axis 404 relative to the flange 522. In one example, the angle 580 that the slot 570 can allow the platen assembly 312 to rotate is approximately twenty (20) degrees about the center axis 404 relative to the flange 522. In one example, the angle 580 that the platen assembly 312 can rotate about the axis 404 relative to the flange 522 can be limited by the biasing member 578 rather than the slot 570. In one example, the gear 504 can be devoid of the slot 570 and the platen assembly 312 can be devoid of the projection 572, and the angle 580 that the platen assembly 312 rotates about the axis of rotation 404 relative to the flange 522 of the gear 504 can be determined by the biasing member 580 (e.g., in response to a biasing force of the biasing member and a counterforce applied to the biasing member 580).

In one example, when the platen assembly 312 is in the media processing position (e.g., shown in FIG. 5F), the projection 572 can be positioned at the first end 576 of the slot 570. As the gear 504 begins to rotate (e.g., in the clockwise direction relative to the orientation of FIG. 5F) and the gear 506 is driven by the gear 504 to rotate (e.g., in the clockwise direction relative to the orientation of FIG. 5F) to move the platen assembly 312 from the media processing position to the media loading position, the gear 506 may rotate a specified number of degrees before the cam formed by the toothless edge 562 engages the guide member 560 of the latch arm 462*a* (e.g., shown in FIG. 5C). As a result, the latch unit 542 remains in the latched position until the gear 506 rotates the specified number of degrees. To account for this, as the gear 504 rotates, the biasing member 578 can urge the platen assembly 312 to remain in the media processing position until the gear 506 rotates at least the specified number of degrees (e.g., the angle 580 is equal to or greater than the specified number of degrees that the gear 506 needs to rotate before the latch unit 542 moves to the unlatched position. As described herein, because the platen assembly 312 can rotate about the axis of rotation 404 relative to the gear 504, the platen assembly 312 can be held in the media processing position as the gears 504 and 506 rotate. In one example, the platen assembly 312 can be held in the media processing position by the biasing member 578 until the projection 572 moves from the first end 574 to the second end 576 and/or until the latch unit 542 move to the unlatched position. Once the gear 506 has rotated the specified number of degrees, the guide member of the latch arm 462*a* engages the cam of the toothless edge 562 causing the latch unit 542 to move from the latched position to the unlatched position, as described herein. After which, the platen assembly 312 can begin to rotate with the gear 504 from the media processing position to the media loading position and the biasing member 578 can hold the platen assembly 312 at the angle 578, as shown in FIG. 5H, until the platen assembly 312 returns to the media processing position. The projection 572 can abut against the second end 576 of the slot 570, before the platen assembly 312 begins to rotate with the gear 504.

As indicated above, FIGS. 5A-H are provided an example mechanism for controlling a position of the latch arms 462 and the platen assembly 312 of an embodiment of the media applicator 200. Other examples may differ from what is described with regard to FIGS. 5A-H. The number and arrangement of devices/components shown in FIGS. 5A-H are provided as an example. In practice, there may be additional devices/components, fewer devices/components, different devices/components, or differently arranged devices/components than those shown in FIGS. 5A-H. Furthermore, two or more devices/components shown in FIGS. 5A-H may be implemented within a single device/component, or a single device/component shown in FIG. 5A-H may be implemented as multiple, distributed devices/components. Additionally, or alternatively, a set of devices/components (e.g., one or more devices/components) shown in FIGS. 5A-H may perform one or more functions described as being performed by another set of devices/components shown in FIGS. 5A-H.

Figure 6A:
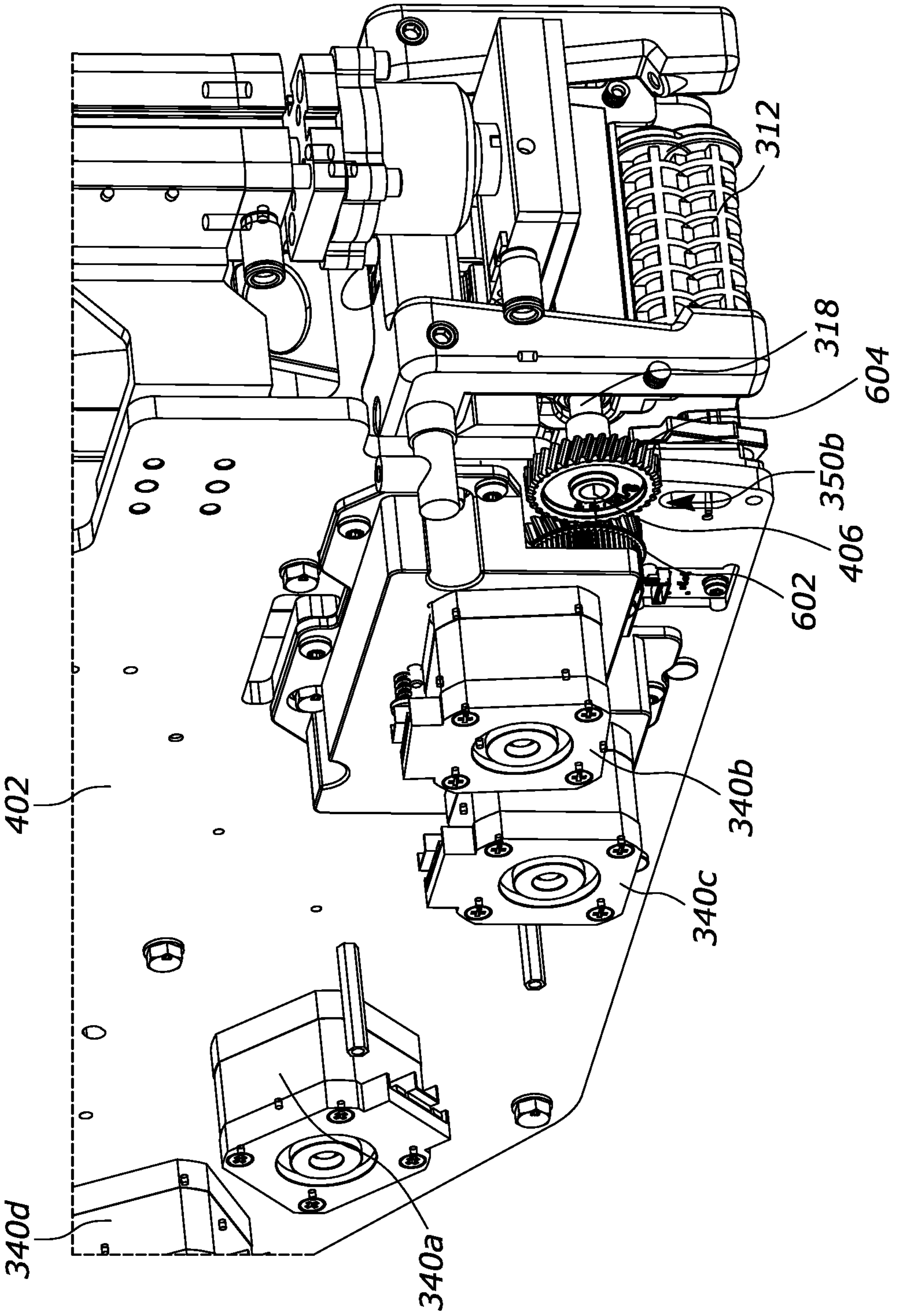
FIGS. 6A-B another example arrangement of components in an interior of an embodiment of the media applicator of FIG. 2 in accordance with embodiments of the present disclosure.
Figure 6B:
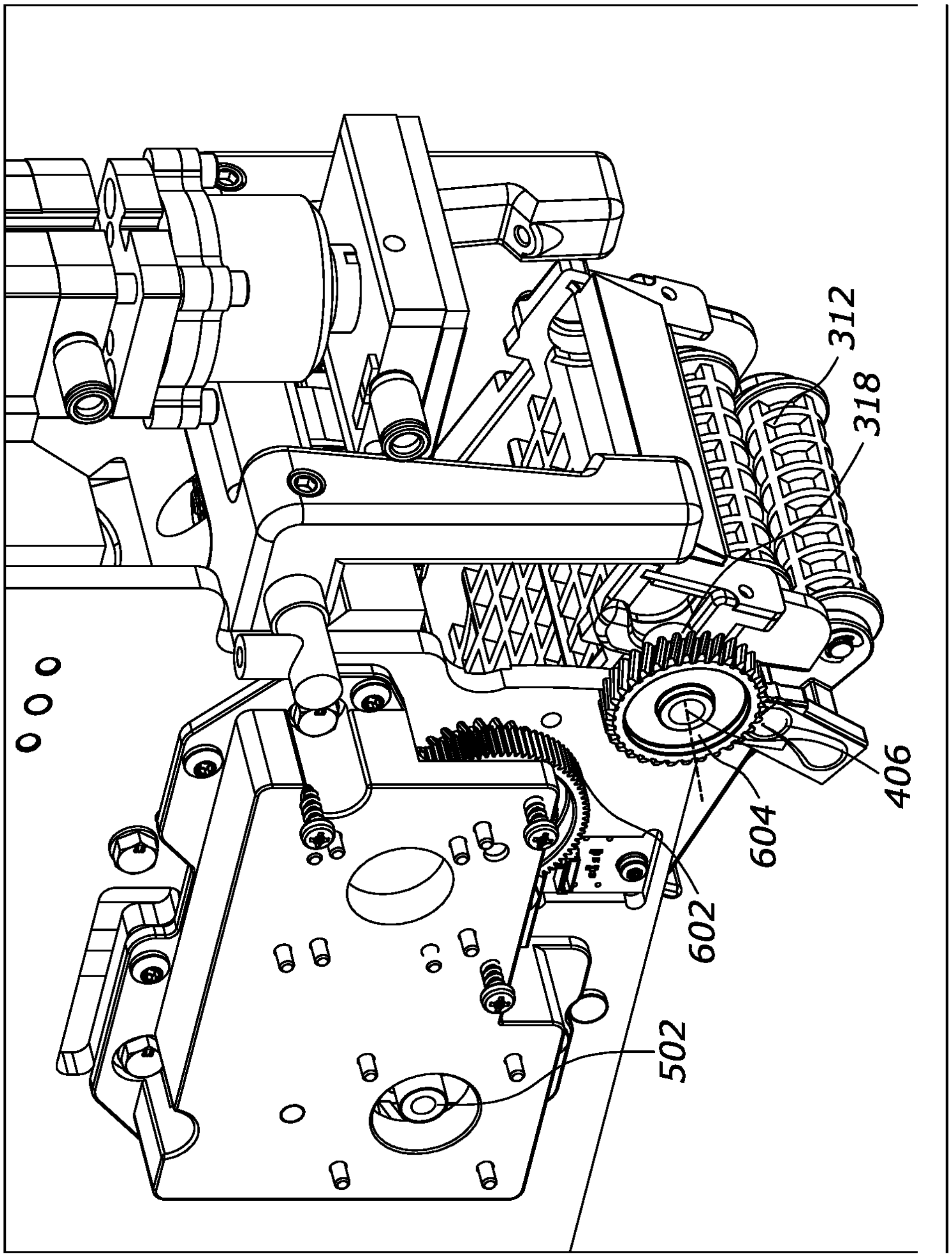

FIGS. 6A-B illustrate an example an opposite side of the chassis 402 shown in FIGS. 4A-F. As shown in FIG. 6A, the motors 340*a-d* can be supported by the chassis 402. FIG. 6B illustrates a portion of the chassis 402 with the motors 340*b* and 340*c* omitted. The other side of gear 502 can be observed in FIG. 6B. The motors 340*a-d* and gear 502 can operate as described herein. Also shown in FIGS. 6A-B is at least a portion of drive train 350*c* that is driven by the motor 340*c*. The drive train 350*c* can include a gear 602 and a gear 604, which can be driven by the motor 340*c* to cause the platen roller 318 to rotate. In one example, the gear 604 can be operatively coupled to a terminal end of the platen roll 318 and can be configured to be coaxial with the platen roller 318 about the platen roller axis of rotation 406. Rotation of the gear 604 can cause the platen roller 318 to rotate in unison with the gear 604.

When the platen assembly 312 is in the media processing position, as shown in FIG. 6A, the gears 602 and 604 can be engaged or meshed, such that when the gear 602 is driven by the motor 340*b*, rotation of the gear 602 is transferred to the gear 604 causing the gear 604 to rotate, which in turn causes the platen roller 318 to rotate. As the platen assembly 312 begins to move from the media processing position to the media loading position, e.g., based on an operation of the motor 340*c*, as shown in FIG. 6B, the gear 604 can move away from the gear 602 such that the gears 602 and 604 are disengage or no longer meshed and rotation of the gear 602 is no longer transferred to the gear 604 (and the platen roller 318 may rotate freely). When the platen assembly 312 returns to the media processing position (shown in FIG. 6A), the gears 602 and 604 can re-engage or re-mesh so that the platen roller 318 can be driven via the motor 340*b* again.

As indicated above, FIGS. 6A-B are provided as example interior arrangements of a media applicator. Other examples may differ from what is described with regard to FIGS. 6A-B. The number and arrangement of devices/components shown in FIGS. 6A-B are provided as an example. In practice, there may be additional devices/components, fewer devices/components, different devices/components, or differently arranged devices/components than those shown in FIGS. 6A-B. Furthermore, two or more devices/components shown in FIGS. 6A-B may be implemented within a single device/component, or a single device/component shown in FIG. 6A-B may be implemented as multiple, distributed devices/components. Additionally, or alternatively, a set of devices/components (e.g., one or more devices/components) shown in FIGS. 6A-B may perform one or more functions described as being performed by another set of devices/components shown in FIGS. 6A-B.

FIGS. 7A-D illustrate an example of a media replenishment system 700 in accordance with embodiments of the present disclosure, which may form an embodiment of the media replenishment system 112 shown, e.g., in FIG. 1. As shown in FIGS. 7A-D, the media replenishment system 700 can include first panel 710 and a second panel 750, where the first and second panels 710 and 750 are moveable with each other between a media presentation position and a media transfer position. A bracket 712 and shafts 714*a-c* can be secured to the first panel 710. The shafts 714*a* and 714*b* can be separated be a specified distance that corresponds to a distance that the spindles 304 and 320 of the media applicator 200 are separated and can be oriented relative to each other to correspond to the orientation of the spindles 304 and 320. The bracket 712 and shafts 714*a-c* can extend from the first panel 710 towards and passed the second panel 750. As one example, the bracket 712 can extend through a notch 752 formed in the second panel 750 and the shafts 714*a-c* can extend through holes in the second panel 750. A distal end 716 of the bracket 714 can include a curved flange 718 about which media can be routed as described herein. Ball bearing housings 754*a-c* and media transfer housings 756*a-b* can be secured to the second panel 750. The media transfer housing 756*a-b* can be secured to a first side of the second panel 750 such that the second panel 750 is disposed between the media transfer housing 756*a-b* and the first panel 710. The ball bearing housings 754*a-c* can be secured to a second side of the second panel 750 that is opposite the first side of the second panel 750 such that the ball bearing housings 754*a-c* are disposed between the first panel 710 and the second panel 750. The shafts 714*a-c* can extend from the first panel 710 through the ball bearing housings 754*a-c* and the through the second panel 750. The shafts 714*a-b* can also extend through the media transfer housings 756*a-b* so that distal ends 720*a-b* of the shafts 714*a-b* extend beyond the media transfer housings 756*a-b* when the media replenishment system 700 is in the media presentation position to allow a supply of media to be mounted on the shafts 714*a-b*. The shafts 714*a-c* and the ball bearing housings 754*a-c* can form linear ball bearings that allow the shafts to slide relative to the ball bearing housings 754*a-c*. A biasing member 760 can be disposed between, and secured to, the first and second panels 710 and 750 to bias the first panel 710 towards the second panel 750, e.g., towards the media presentation position. In one example, a length of the ball bearing housings 754*a-c* can determine a minimum distance by which the first panel 710 and the second panel 750 can be separated.

Figure 7A:
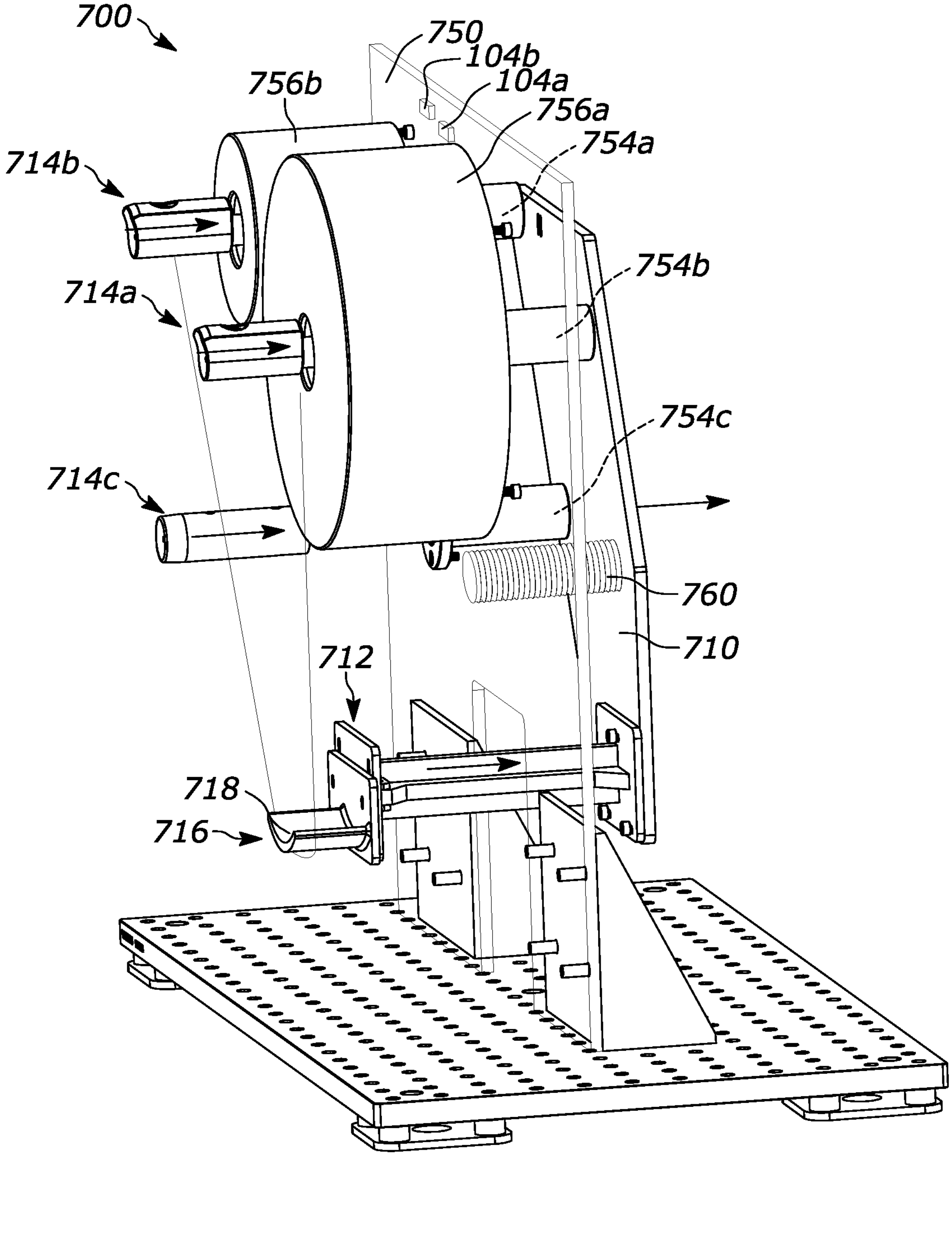
FIGS. 7A-D illustrate an example of a media replenishment system in accordance with embodiments of the present disclosure.
Figure 7B:
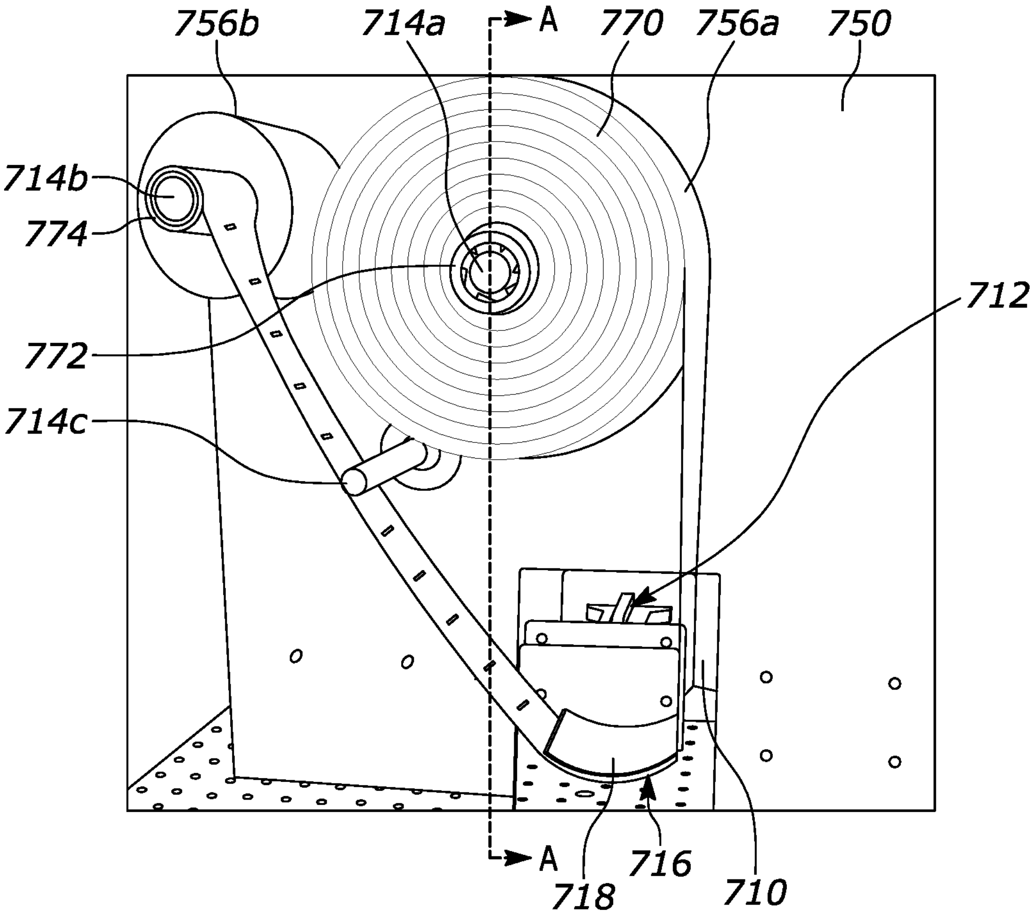
Figure 7C:
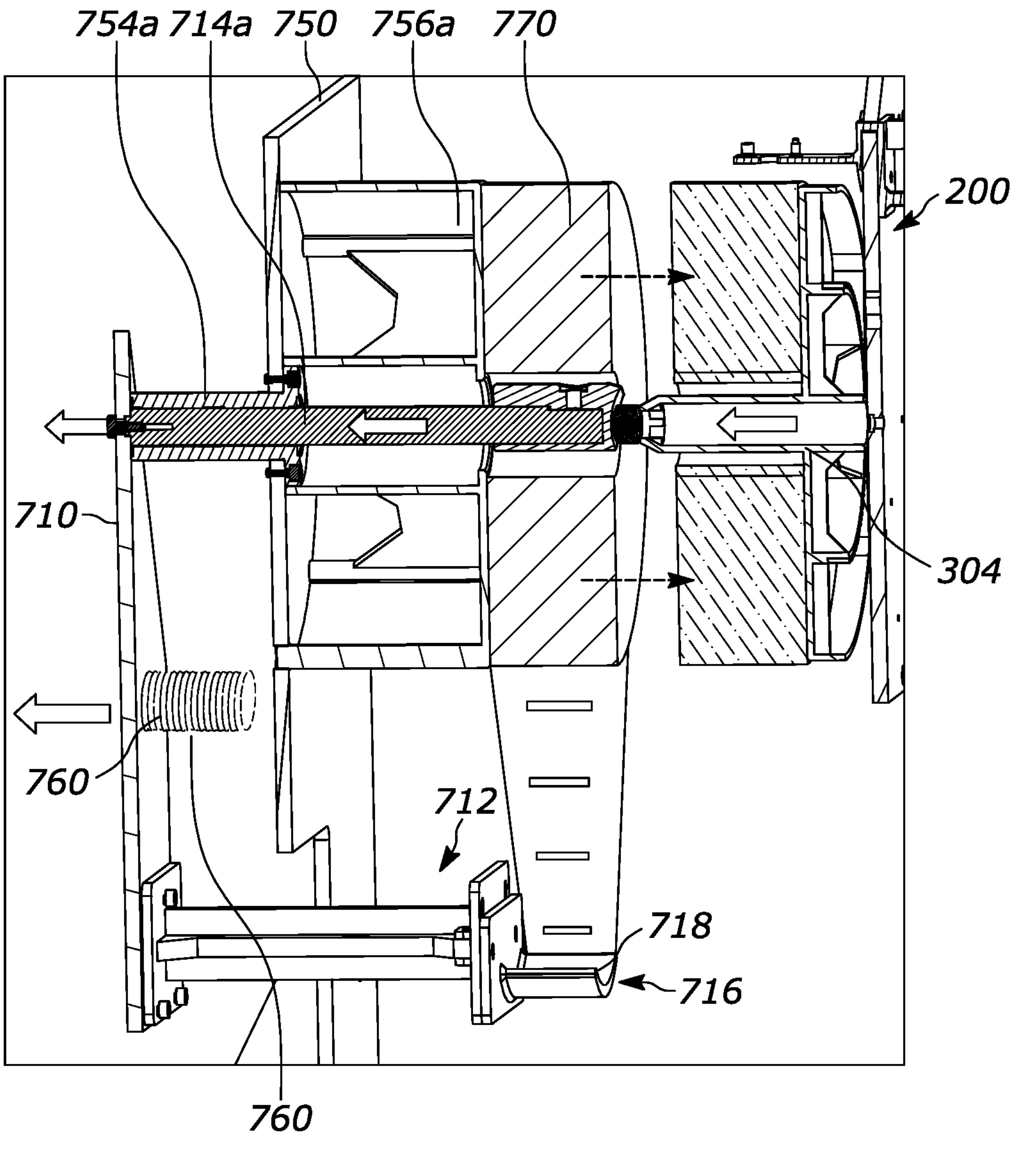
Figure 7D:
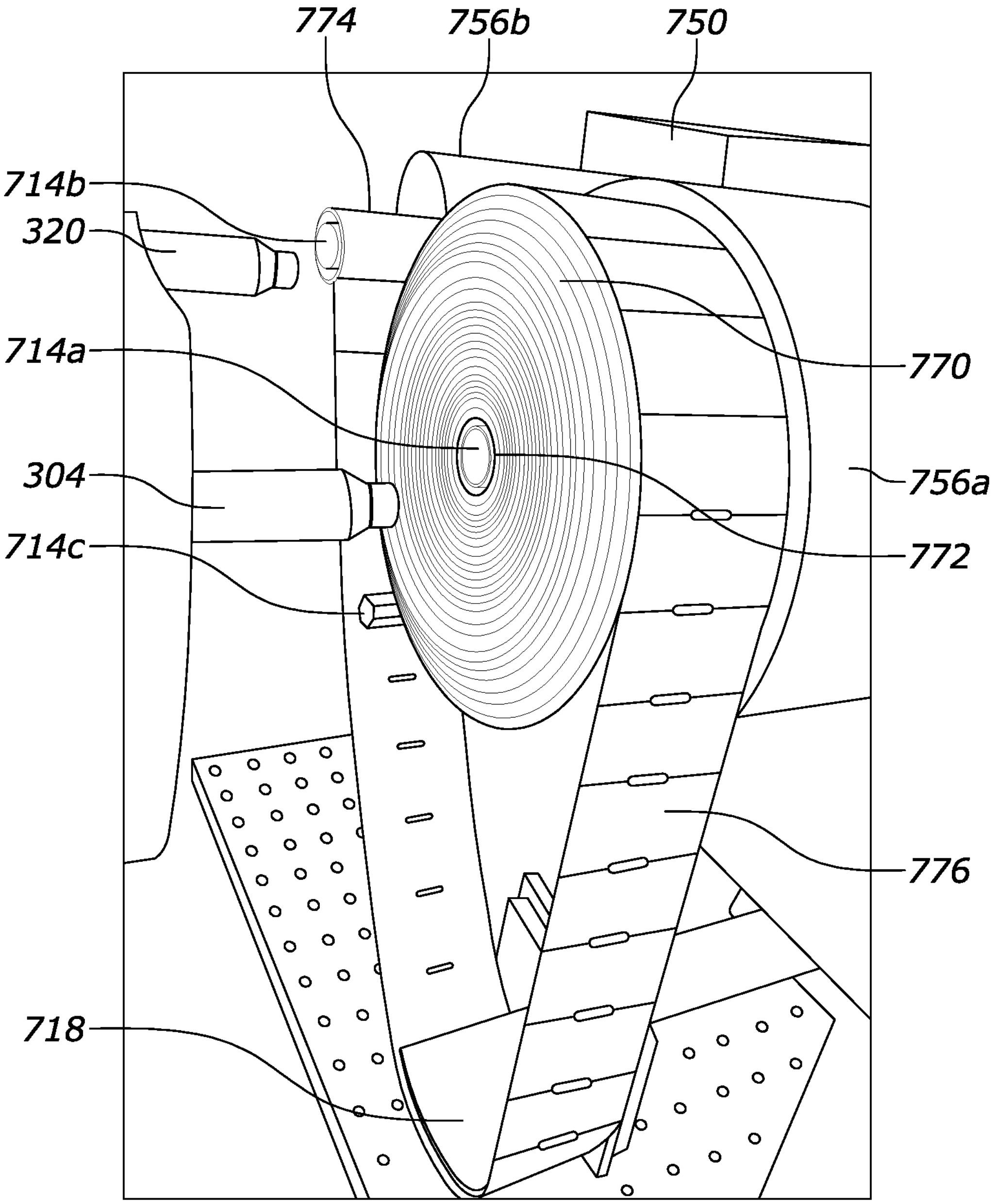

As shown in FIG. 7B, a media roll 770 can have a first core 772 supporting the roll of media 770. A second core 774 can be coupled to a terminal end of the media or a liner of the media. To load the media roll 770 on the media replenishment system 700, the first core 772 and media roll 770 are mounted on the shaft 714*a* when the media replenishment system 700 is in the media presentation position. A length of media 776 can be dispensed from the media roll 770 and can be routed around the curved flange and the shaft 714*c* and the second core 774 can be mounted on the shaft 714*b*. Before the media applicator 200 retrieves the media roll 770 from the media replenishment system 700, the media applicator 200 can discard the remnants of the exhausted supply of media, e.g., media core, take-up core media, and/or a liner of the media, if any, already within the media applicator (e.g., in a receptacle). In some embodiments pressurized air can be forced through the spindles 304 and/or 320 (e.g., via valves 360 and conduit 362) to aid in ejecting the remnants of the exhausted supply of media from the media applicator 200. To retrieve the media roll 770, the media applicator 200 can expose the interior of the media applicator 200, e.g., by opening an access door 210, and can interface with the media 700 on the media replenishment system 700 by aligning the media payout spindle 304 and the take-up spindle 320 with the shaft 714*a* and 714*b*, respectively, or by aligning the media payout spindle 304 and the take-up spindle 320 with the shaft 714*b* and the shaft 714*a*, respectively. The camera(s) 104*a* and/or the sensor(s) 104*b* of the media replenishment system 700 (shown in FIG. 7A) and/or the media applicator 200 can aid in aligning the media applicator 200 with media 770 to be installed in the media applicator 200. The media applicator 200 can move the platen assembly 312 to the media loading position. Once the platen assembly 312 is in the media loading position, the media applicator 200 is moved, e.g., by the robotic device (e.g., robotic device 110 or 120), into position to engage the shafts 714*a-b* with the spindles 304 and 320, respectively, and to engage shaft 314*c* and the flange 718 with the media applicator 200, e.g., the chassis 402 of the media applicator 200. The media applicator 200 can be moved so that the spindles 304 and/or 320 and the media applicator 200 push the shaft 314*a-c* and the bracket 712 towards the second panel 750 to transition from the media presentation position to the media transfer position. As the shafts 714*a-c* and the bracket 712 are secured to the first panel, the first panel 710 can move away from the second panel 750, due to the force being exerted on the shafts 714*a-c* and the bracket 712 by the media applicator 200, which can overcome the biasing force of the biasing member 760. As the shafts 714*a-b* are pushed towards the second panel 750, the distal ends 720*a-b* of the shafts 714*a-b* are received within the cavities 758*a-b* of the media transfer housings 756*a-b* such that the media replenishment system 700 is in the media transfer position and the spindles 304 and 320 now support the cores 772 and 774, respectively. The shaft 714*c* and the bracket can also be displaced such that the length of media 776 no longer extends around the shafter 714*c* and the flange 718, but instead the length of media 776 is routed around the platen assembly 312, e.g., as shown in FIG. 4E, so that a portion of the length of media 776 is disposed between the printhead and the platen roller 318.

Once the media roll 770 has been transferred to the media applicator 200, the media applicator 200 can be moved away from the replenishment system 700 (e.g., via the robotic device 110 or 120) causing the biasing member to move the media replenishment system 700 back to the media presentation position so that another media roll can be mounted on the media replenishment system 700. The platen assembly 312 can return to the media processing position (e.g., as shown in FIG. 4F) after the media applicator is moved away from the media replenishment system 700 and the access door 210 can be closed. The media applicator 210 is now replenished and ready to process and apply media to objects via the robotic device 110 as described herein. In some examples, once the media roll 770 is received by the media applicator 200, the media applicator 200 need to tension the media for proper operation. To achieve this, the media applicator 200, can drive the take-up spindle 320, via the motor 340*d* and drive train 350*d*, while keeping the spindle 304 fixed to pull any slack in the length of media 776 onto the take-ups spindle; can drive the payout spindle 304 in reverse via the motor 340*d* and drive train 350*d* (e.g., counterclockwise in the orientation of FIG. 4F), while keeping the spindle 320 fixed to pull any slack in the length of media 776 onto the payout spindle 304; or can drive the spindle 304 in reverse and can drive the spindle 320 to pull any slack in the length of media 776 onto the payout spindle 304 and the take-up spindle 320, respectively, to exert tension the media. In some examples, the media can be pre-tensioned by the media replenishment system 700.

As indicated above, FIGS. 7A-D are provided as an example of a media replenishment system. Other examples may differ from what is described with regard to FIGS. 7A-D. The number and arrangement of devices/components shown in FIGS. 7A-D are provided as an example. In practice, there may be additional devices/components, fewer devices/components, different devices/components, or differently arranged devices/components than those shown in FIGS. 7A-D. Furthermore, two or more devices/components shown in FIGS. 7A-D may be implemented within a single device/component, or a single device/component shown in FIG. 7A-D may be implemented as multiple, distributed devices/components. Additionally, or alternatively, a set of devices/components (e.g., one or more devices/components) shown in FIGS. 7A-D may perform one or more functions described as being performed by another set of devices/components shown in FIGS. 7A-D.

The above description refers to diagrams of the accompanying drawings. Alternative implementations of the example represented by the diagrams include one or more additional or alternative elements, processes and/or devices. Additionally or alternatively, one or more of the example elements of the diagram may be combined, divided, re-arranged or omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system comprising:

a printhead;

a motor;

a drive train operatively coupled to the motor; and a platen assembly including a platen roller, the platen assembly operatively coupled to the drive train and configured to rotate about a platen assembly axis of rotation, in response to an operation of the motor, between a media processing position in which the platen roller forms a nip with the printhead and a media loading position in which the platen roller is rotated away from the printhead about the platen assembly axis of rotation, wherein the drive train comprises:

a first gear operatively coupled to the motor;

a second gear operatively coupled to the first gear, the motor is configured to rotate the platen assembly by driving the first and second gears; and a third gear operatively coupled to the second gear, the third gear configured to engage a latch to move the latch between the latched position and the unlatched position.

2. The system of claim 1, wherein the second gear includes a flange and a shaft disposed at a proximal end of the flange, the platen assembly is operatively coupled to the second gear via the shaft and the flange operatively supports the platen assembly when the platen assembly is in the media processing position.

3. The system of claim 2, wherein the shaft and flange extend from the gear parallel to each other and parallel to the platen assembly axis of rotation.

4. The system of claim 2, wherein the platen assembly freely rotates relative to the second gear and the flange limits a rotation of the platen assembly in the media processing position.

5. The system of claim 4, wherein when the second gear rotates to move the platen assembly from the media loading position to the media processing position, the flange urges the platen assembly towards the media processing position.

6. The system of claim 5, further comprising:

a biasing member disposed between the flange and the platen assembly, the biasing member exerts a biasing force on the platen assembly when the platen assembly is in the media processing position.

7. The system of claim 6, wherein when the platen roller is in the media loading position, the biasing member pushes the platen roller to rotate away from the flange.

8. The system of claim 4, wherein when the second gear rotates to move the platen assembly from the media processing position to the media loading position, the platen assembly moves with the flange.

9. The system of claim 1, wherein the second gear is sector gear that includes first and second stop structures that limit the rotation of the second gear.

10. The system of claim 1, wherein the third gear is a sector gear and a toothless edge of the third gear forms a cam, and the system further comprising:

a guide member operatively coupled to a latch arm of the latch, the guide member configured to engage and ride along the toothless edge of the third gear and the cam is configured to displace the guide member to move the latch arm of the latch between the latched position and the unlatched position.

11. The system of claim 1, further comprising:

a further motor;

a further drive train, the further drive train including a first gear and a second gear, the first gear is operatively coupled to the further motor, the second gear selectively engages with the first gear and is coupled to the platen roller, the second gear engages the first gear when the platen assembly is in the media processing position and disengages the first gear when the platen assembly in the media loading position.

12. A system comprising:

a printhead;

a motor;

a drive train operatively coupled to the motor; and a platen assembly including a platen roller, the platen assembly operatively coupled to the drive train and configured to rotate about a platen assembly axis of rotation, in response to an operation of the motor, between a media processing position in which the platen roller forms a nip with the printhead and a media loading position in which the platen roller is rotated away from the printhead about the platen assembly axis of rotation a printhead assembly configured to include the printhead and a latch, the latch configured to retain the platen assembly in the media processing position, the latch comprises a latch arm extending from the printhead assembly, the latch arm is biased towards a latched position and is configured to engage the platen assembly when the platen assembly is in the media processing position.

13. The system of claim 12, wherein when the platen assembly begins to transition from the media processing position to the media loading position, the latch arm is urged to an unlatched position to disengage the platen assembly.

14. A system comprising:

a media applicator, comprising:

a printhead;

a motor;

a drive train operatively coupled to the motor;

a platen assembly including a platen roller, the platen assembly operatively coupled to the drive train and configured to rotate about a platen assembly axis of rotation, in response to an operation of the motor, between a media processing position in which the platen roller forms a nip with the printhead and a media loading position in which the platen roller is rotated away from the printhead about the platen assembly axis of rotation; and a housing including the printhead, the motor, the drive train, and the platen assembly;

a media replenishment system configured to present a supply of media for autonomous installation of the supply of media in the media applicator;

a robotic device operatively coupled to the media applicator, the robotic device configured to move the media applicator, the robotic device being configured to move the media applicator relative to the media replenishment system to facilitate transfer of the supply of media from the media replenishment system to the media applicator, wherein the media replenishment system comprises:

a first panel;

a second panel, the first and second panels being moveable relative to each other to move between a media presentation position and a media transfer position; and a plurality of shafts extending from the first panel through and beyond the second panel, the plurality of shafts configured to support the supply of media with the second panel disposed between the supply of media and the first panel.

15. The system of claim 14, wherein the media replenishment system is configured with a media presentation position in which the media replenishment system supports the supply of media and a media transfer position in which the media replenishment system transfers the media from the media replenishment system to the media applicator.

16. The system of claim 15, wherein engagement of the media replenishment system by the media applicator based on movement by the robotic device causes the media replenishment system to transition from the media presentation position to the media transfer position.

17. The system of claim 14, further comprising:

a biasing member disposed between the first panel and the second panel to bias the first and second panel to the media presentation position.

18. A method comprising:

disposing a printhead in a housing;

disposing a motor in the housing;

disposing a drive train in the housing, the drive train operatively coupled to the motor; and disposing a platen assembly including a platen roller in the housing, the platen assembly operatively coupled to the drive train and configured to rotate about a platen assembly axis of rotation, in response to an operation of the motor, between a media processing position in which the platen roller forms a nip with the printhead and a media loading position in which the platen roller is rotated away from the printhead about the platen assembly axis of rotation, wherein disposing the drive train in the housing comprises:

operatively coupling a first gear to the motor;

operatively coupling a second gear to the first gear, the motor is configured to rotate the platen assembly by driving the first and second gears; and operatively coupling a third gear to the second gear, the third gear configured to engage a latch to move the latch between the latched position and the unlatched position.

* * * * *